(12) United States Patent
Cheon et al.

(10) Patent No.: US 12,254,183 B2
(45) Date of Patent: Mar. 18, 2025

(54) STORAGE DEVICE INCLUDING NON-VOLATILE MEMORY DEVICE AND OPERATING METHOD OF STORAGE DEVICE

(71) Applicant: Samsung Electronics Co., Ltd., Suwon-si (KR)

(72) Inventors: Daesung Cheon, Suwon-si (KR); Young-Rok Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 18/239,166

(22) Filed: Aug. 29, 2023

(65) Prior Publication Data

US 2024/0241642 A1 Jul. 18, 2024

(30) Foreign Application Priority Data

Jan. 18, 2023 (KR) ........................ 10-2023-0007055

(51) Int. Cl.
  *G06F 12/00* (2006.01)
  *G06F 3/06* (2006.01)

(52) U.S. Cl.
  CPC ............ *G06F 3/061* (2013.01); *G06F 3/0631* (2013.01); *G06F 3/0644* (2013.01); *G06F 3/0679* (2013.01)

(58) Field of Classification Search
  CPC ...... G06F 3/061; G06F 3/0631; G06F 3/0644; G06F 3/0679; G06F 3/0653; G06F 3/0658; G06F 3/064
  USPC ....................................................... 711/118
  See application file for complete search history.

(56) References Cited

U.S. PATENT DOCUMENTS

| | | |
|---|---|---|
| 9,176,864 B2 | 11/2015 | Gorobets et al. |
| 10,289,323 B2 | 5/2019 | Yang et al. |
| 10,303,392 B2 | 5/2019 | Agombar et al. |
| 10,846,010 B2 | 11/2020 | Gwin et al. |
| 11,016,545 B2 | 5/2021 | Yang et al. |
| 11,119,908 B2 | 9/2021 | Walker et al. |
| 2021/0034256 A1 | 2/2021 | Kotra et al. |
| 2021/0382643 A1* | 12/2021 | Muthiah ............... G06F 3/0616 |
| 2022/0019722 A1 | 1/2022 | Shen et al. |

FOREIGN PATENT DOCUMENTS

WO  WO-2022072993 A1 *  4/2022  ......... G06F 12/0246

* cited by examiner

*Primary Examiner* — Mardochee Chery
(74) *Attorney, Agent, or Firm* — Muir Patent Law, PLLC

(57) ABSTRACT

Disclosed is a storage device which includes non-volatile memory devices, temperature sensors, and a storage controller receiving temperature information from the temperature sensors. Each of the plurality of memory blocks is allocated to one of a plurality of zones, and the storage controller performs a first zone reallocation operation to reallocate a block of a non-volatile memory device with a lower temperature to a zone with a higher hit ratio and to reallocate a block of a non-volatile memory device with a higher temperature to a zone with a lower hit ratio. The storage controller performs a first zone rating to generate a first table based on hit ratio information of the zones, performs a first memory rating to generate a second table based on the temperature information, and performs the first zone reallocation operation based on the first table and the second table.

20 Claims, 15 Drawing Sheets

FIG. 7A

1st Table

| ID_Zone | Zone |
|---------|------|
| Rate1   | Z4   |
| Rate2   | Z1   |
| Rate3   | Z5   |
| Rate4   | Z2   |
| Rate5   | Z6   |
| Rate6   | Z3   |

High Hit Ratio ↕ Low Hit Ratio

Hot Zone (Rate1, Rate2)
Warm Zone (Rate3, Rate4)
Cold Zone (Rate5, Rate6)

FIG. 7B

2nd Table

| ID_Memory | NVM  |
|-----------|------|
| Rate1     | NVM2 |
| Rate2     | NVM3 |
| Rate3     | NVM1 |

Low Temperature ↕ High Temperature

Cold Type (Rate1)
Warm Type (Rate2)
Hot Type (Rate3)

FIG. 7C

Result Table

| Zone | BLK |
|---|---|
| Z4 | BLK2_1 |
| Z1 | BLK2_2 |
| Z5 | BLK3_1 |
| Z2 | BLK3_2 |
| Z6 | BLK1_1 |
| Z3 | BLK1_2 |

Hot Zone: Z4, Z1
Warm Zone: Z5, Z2
Cold Zone: Z6, Z3

NVM2 (Cold Type): BLK2_1, BLK2_2
NVM3 (Warm Type): BLK3_1, BLK3_2
NVM1 (Hot Type): BLK1_1, BLK1_2

FIG. 9A

1st Table

| ID_Zone | Zone |
|---------|------|
| Rate1   | Z3   |
| Rate2   | Z1   |
| Rate3   | Z4   |
| Rate4   | Z2   |

High Hit Ratio ↑ ↓ Low Hit Ratio

Hot Zone
Warm Zone
Cold Zone

STORAGE DEVICE INCLUDING NON-VOLATILE MEMORY DEVICE AND OPERATING METHOD OF STORAGE DEVICE

CROSS-REFERENCE TO RELATED APPLICATIONS

This application claims priority under 35 U.S.C. § 119 to Korean Patent Application No. 10-2023-0007055 filed on Jan. 18, 2023, in the Korean Intellectual Property Office, the disclosures of which are incorporated by reference herein in their entireties.

BACKGROUND

Embodiments of the present disclosure described herein relate to an electronic device, and more particularly, relate to a storage device including a non-volatile memory device and an operating method of the storage device.

A storage device refers to a device, which stores data under control of a host device, such as a computer, a smartphone, or a smart pad. The storage device includes a device, which stores data on a magnetic disk, such as a hard disk drive (HDD), or a device, which stores data in a semiconductor memory, in particular, a non-volatile memory, such as a solid state drive (SSD) or a memory card.

The non-volatile memory includes a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), etc.

An increase in the temperature of a non-volatile memory may cause a reduction of performance and endurance of the non-volatile memory. Accordingly, performance and endurance of non-volatile memory may be enhanced through devices and methods that may reduce the temperature of non-volatile memory for a given level of performance.

SUMMARY

Embodiments of the present disclosure provide a storage device decreasing a temperature of a non-volatile memory device and an operating method of the storage device.

According to an embodiment, a storage device includes a plurality of non-volatile memory devices each including a plurality of memory blocks, a plurality of temperature sensors, wherein each temperature sensor of the plurality of temperature sensors that senses a temperature related to at least one of the plurality of non-volatile memory devices, and a storage controller that receives temperature information about the plurality of non-volatile memory devices from the plurality of temperature sensors. Each of the plurality of memory blocks is allocated to one of a plurality of zones, and the storage controller performs a first zone reallocation operation to reallocate a block of a non-volatile memory device with a lower temperature to a zone with a higher hit ratio and to reallocate a block of a non-volatile memory device with a higher temperature to a zone with a lower hit ratio. The storage controller performs a first zone rating to generate a first table in which identifiers of the plurality of zones are sorted, based on hit ratio information of the plurality of zones, performs a first memory rating to generate a second table in which identifiers of the plurality of non-volatile memory devices are sorted, based on the temperature information, and performs the first zone reallocation operation based on the first table and the second table to generate a result table to reallocate the plurality of memory blocks.

According to an embodiment, an operating method of a storage device which includes a plurality of non-volatile memory devices each including a plurality of blocks, a plurality of temperature sensors, and a storage controller includes performing a first zone rating to generate a first table in which identifiers of a plurality of zones are sorted, based on hit ratio information of the plurality of zones, performing a first memory rating to generate a second table in which identifiers of the plurality of non-volatile memory devices are sorted, based on temperature information received from the plurality of temperature sensors, and performing a first zone reallocation operation to generate a result table, based on the first and second tables. The plurality of temperature sensors obtain the temperature information by sensing temperatures related to the plurality of non-volatile memory devices. The storage device performs the first zone reallocation operation by reallocating a block of a non-volatile memory device with a lower temperature to a zone with a higher hit ratio and reallocating a block of a non-volatile memory device with a higher temperature to a zone with a lower hit ratio, with regard to the plurality of zones to the plurality of blocks are allocated.

According to an embodiment, a storage controller includes a ZNS manager that communicates with a plurality of non-volatile memory devices each including a plurality of blocks and receives temperature information about the plurality of non-volatile memory devices from a plurality of temperature sensors configured to respectively sense temperatures of the plurality of non-volatile memory devices, and a block allocator that allocates the plurality of blocks to a plurality of zones under control of the ZNS manager. Each of the plurality of memory blocks is allocated to one of a plurality of zones, and the block allocator performs a zone reallocation operation to reallocate a block of a non-volatile memory device with a lower temperature to a zone with a higher hit ratio and to reallocate a block of a non-volatile memory device with a higher temperature to a zone with a lower hit ratio. The ZNS manager performs a zone rating to sort identifiers of the plurality of zones, based on hit ratio information of the plurality of zones, performs a memory rating to sort identifiers of the plurality of non-volatile memory devices, based on the temperature information. The block allocator performs a zone reallocation operation based on results of performing the zone rating and the memory rating.

BRIEF DESCRIPTION OF THE FIGURES

The above and other objects and features of the present disclosure will become apparent by describing in detail embodiments thereof with reference to the accompanying drawings.

FIGS. 7A to 7C are diagrams describing a zone reallocation operation according to an embodiment of the present disclosure.

FIGS. 9A to 9C are diagrams describing a zone reallocation operation according to an embodiment of the present disclosure.

DETAILED DESCRIPTION

Embodiments of the present disclosure will be described more fully hereinafter with reference to the accompanying drawings. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

It will be understood that when an element is referred to as being "connected" to another element, the element is able to communicate (e.g., transmit and/or receive data) with the another element. For example, an element may be connected to another element through a communication medium such as network, a wire line, a wireless communication link, or a bus. When an element is "connected" to another element it can be directly connected or intervening elements may be present.

Figure 1:
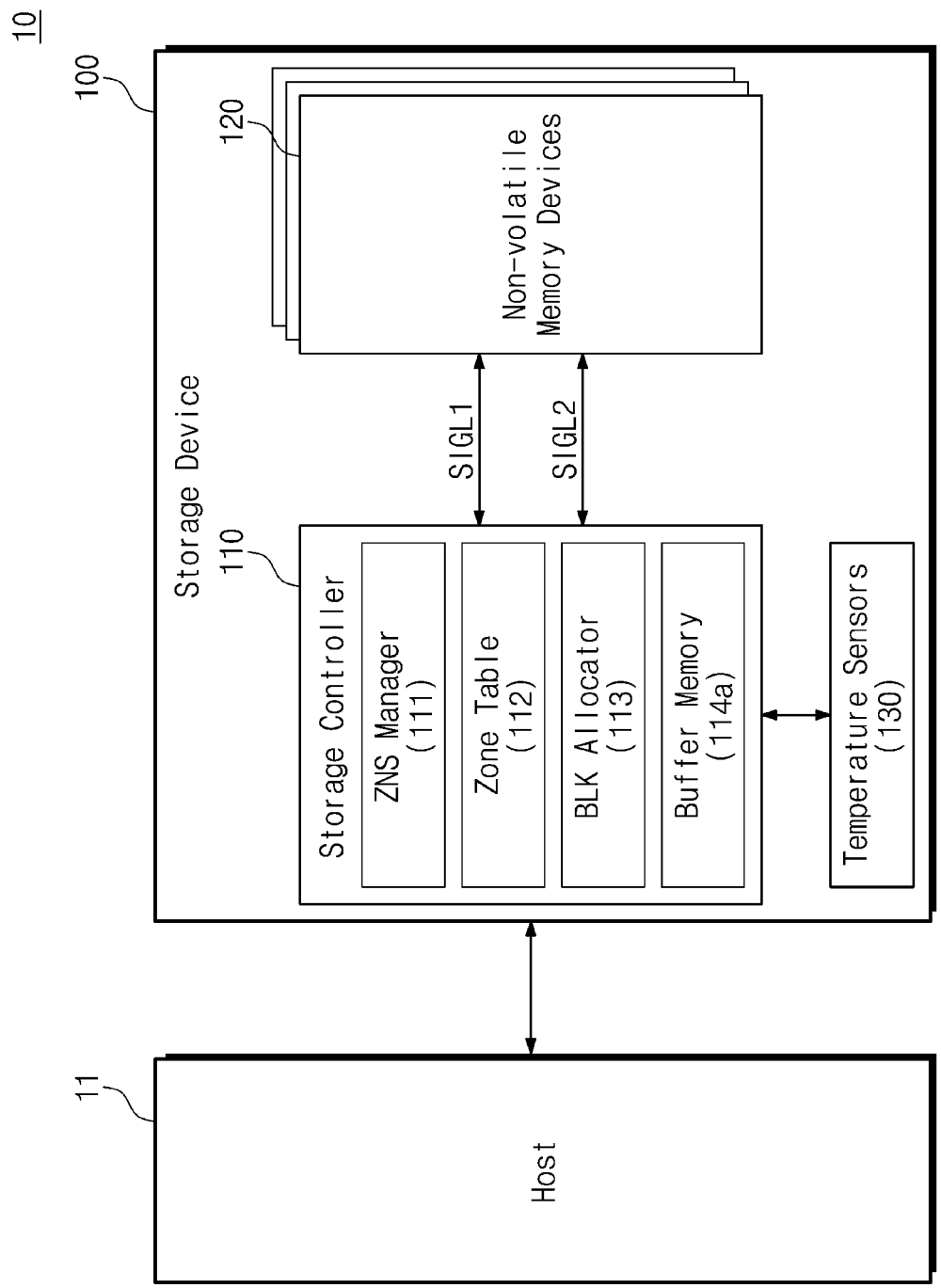
FIG. 1 is a block diagram illustrating a storage system according to an embodiment of the present disclosure.

FIG. 1 is a block diagram of a storage system 10 according to an embodiment of the present disclosure. Referring to FIG. 1, a storage system 10 may include a host 11 and a storage device 100. In some embodiments, the storage system 10 may refer to a computing system, which is configured to process a variety of information, such as a personal computer (PC), a notebook, a laptop, a server, a workstation, a tablet PC, a smartphone, a digital camera, or a black box.

The host 11 may control an overall operation of the storage system 10. For example, the host 11 may store data in the storage device 100 or may read data stored in the storage device 100. For example, the host 11 may provide write data to the storage device 100, or the host 11 may request read data stored in the storage device 100.

The storage device 100 may include a storage controller 110 (described in detail in FIG. 2), a plurality of non-volatile memory devices 120, and a plurality of temperature sensors 130. The non-volatile memory devices 120 may store data. The storage controller 110 may receive various requests for writing data in the non-volatile memory devices 120 or reading data from the non-volatile memory devices 120, from the host 11.

The storage device 100 may allocate memory blocks of the non-volatile memory devices 120 to a zone depending on a request of the host 11 and may sequentially store data in the allocated memory blocks. The zone may conceptually refer to some memory blocks physically continuous (or sequential) to each other from among a plurality of memory blocks. For example, the storage controller 110 and the non-volatile memory devices 120 may support the zoned namespace (ZNS) standard of the non-volatile memory express (NVMe). The ZNS standard will be described in detail with reference to FIGS. 4 and 5.

The storage controller 110 may be connected to the non-volatile memory devices 120 and may access the non-volatile memory devices 120 through first signal lines SIGL1 and second signal lines SIGL2. For example, the storage controller 110 may transmit a command and an address to the non-volatile memory devices 120 through the first signal lines SIGL1. The storage controller 110 may exchange data with the non-volatile memory devices 120 through the first signal lines SIGL1.

The storage controller 110 may transmit a first control signal to the non-volatile memory devices 120 through the second signal lines SIGL2. The storage controller 110 may receive a second control signal from the non-volatile memory devices 120 through the second signal lines SIGL2.

The storage controller 110 may include a ZNS manager 111, a zone table controller 112, a block allocator 113, and a buffer memory 114a. An example implementation of the ZNS manager 111, the zone table controller 112, and the block allocator 113 will be described in further detail in relation to FIG. 2.

The ZNS manager 111 may receive requests complying with the ZNS standard from the host 11 and may process the requests complying with the ZNS standard. For example, depending on the request of the host 11, the ZNS manager 111 may change a device state, may perform allocation/deallocation of a memory block to/from a zone, and may control the buffer memory 114a such that data present in the buffer memory 114a are provided to the allocated memory block.

The ZNS manager 111 may allow the block allocator 113 to perform a zone reallocation operation on a plurality of zones to which a plurality of blocks are allocated. For example, the ZNS manager 111 may receive a zone reallocation request from the host 11 and may perform zone rating and memory rating based on the zone reallocation request. Under control of the ZNS manager 111, the block allocator 113 may perform the zone reallocation operation based on results of performing the zone rating and the memory rating.

For example, the ZNS manager 111 may perform the zone rating and the memory rating after a reference time passes from a point in time when a plurality of blocks are allocated to a plurality of zones. In this case, the reference time may be set arbitrarily. Under control of the ZNS manager 111, the block allocator 113 may perform zone reallocation operation based on results of performing the zone rating and the memory rating.

The ZNS manager 111 may perform the zone rating for sorting identifiers of the plurality of zones. For example, the ZNS manager 111 may perform the zone rating for sorting the identifiers of the plurality of zones, based on hit ratio information of the plurality of zones. A hit ratio of a zone may indicate the frequency at which data of the zone are updated. The hit ratio of the zone may indicate how active a zone is and may be related to the update frequency of memory blocks within the zone. In some embodiments, the zone hit ratio may be the number of memory blocks updated in a zone divided by the total number of memory blocks updated during a period of time, which may be a predetermined period of time.

The ZNS manager 111 may classify a zone as one of a hot zone, a warm zone, and a cold zone based on the hit ratio of the zone.

For example, when the update frequency of data of a first zone Z1 is lower than a first threshold value, the ZNS manager 111 may classify the first zone Z1 as the cold zone. When the update frequency of data of a second zone Z2 is higher than or equal to the first threshold value and is lower than a second threshold value, the ZNS manager 111 may classify the second zone Z2 as the warm zone. When the update frequency of data of a third zone Z3 is higher than or equal to the second threshold value, the ZNS manager 111 may classify the third zone Z3 as the hot zone.

The ZNS manager 111 may perform the memory rating for sorting identifiers of the plurality of non-volatile memory devices 120. For example, the ZNS manager 111 may perform the memory rating for sorting the identifiers of the plurality of non-volatile memory devices 120.

The ZNS manager 111 may classify the plurality of non-volatile memory devices 120 into a hot type, a warm type, and a cold type, based on temperature information respectively received from the plurality of temperature sensors 130. Each temperature sensor 130 may be configured to sense a temperature associated with at least one of the non-volatile memory devices. The temperature associated with associated with at least one of the non-volatile memory devices 120 may be an ambient temperature near at least one of the non-volatile memory devices 120, a surface temperature of a non-volatile memory device 120, or an internal temperature of a non-volatile memory device 120. A temperature measured by a temperature sensor 130 may be used by the ZNS manager 111 to classify the non-volatile memory devices 120.

For example, when a temperature sensor of a first non-volatile memory device NVM1 measures a temperature that is lower than the first threshold value, the ZNS manager 111 may classify the first non-volatile memory device NVM1 as the cold type. When a temperature sensor of a second non-volatile memory device NVM2 measures a temperature that is higher than or equal to the first threshold value and is lower than the second threshold value, the ZNS manager 111 may classify the second non-volatile memory device NVM2 as the warm type. When a temperature sensor of a third non-volatile memory device NVM3 measures a temperature that is higher than the second threshold value, the ZNS manager 111 may classify the third non-volatile memory device NVM3 as the hot type.

In this case, the first non-volatile memory device NVM1 of the cold type may decrease or have no negative impact on (e.g., does not increase) the internal temperature of the storage device 100, the second non-volatile memory device NVM2 of the warm type may maintain or finely increase the internal temperature of the storage device 100, and the third non-volatile memory device NVM3 of the hot type may increase the internal temperature of the storage device 100. The ZNS manager 111 may determine at various times whether a zone reallocation condition is satisfied. When it is determined that the zone reallocation condition is satisfied, the ZNS manager 111 may allow the block allocator 113 to perform a zone reallocation operation. When it is determined that the zone reallocation condition is not satisfied, the ZNS manager 111 may skip performing the zone reallocation operation and periodically determine whether the zone reallocation condition is satisfied. Periodically determining whether the zone reallocation condition is satisfied may be based on a reference time from a point in time when it is determined that the zone reallocation condition is not satisfied. In this case, the reference time may be set arbitrarily. The zone reallocation condition may include comparing a number of memory blocks that satisfy a zone reallocation policy to a number of memory blocks that do not satisfy a zone reallocation policy.

The zone table controller 112 may manage state information indicating a state of each of the plurality of zones and block allocation information indicating memory blocks allocated to each of the plurality of zones. The state information may be stored in at least one table which may be stored in a memory device. In some embodiments, the ZNS manager 111 may manage and/or control the zone table controller 112. In some embodiments, the zone table controller 112 may be integrated in the ZNS manager 111 and the ZNS manager 111 may perform the operations of the zone table controller 112 for updating the at least one table.

Under control of the ZNS manager 111, the zone table controller 112 may manage state information indicating states of the plurality of zones. For example, under control of the ZNS manager 111, the zone table controller 112 may generate the at least one table for managing the plurality of state information respectively indicating the states of the plurality of zones. When the host 11 requests the ZNS manager 111 to transition (e.g., change) a state of a zone, the zone table controller 112 may update the at least one table such that the state transition is applied thereto (e.g., an updated state for the zone is recorded in the at least one table).

Under control of the ZNS manager 111, the zone table controller 112 may manage a plurality of block allocation information indicating memory blocks allocated to the plurality of zones. For example, under control of the ZNS manager 111, the zone table controller 112 may generate at least one table for managing the plurality of block allocation information indicating the memory blocks allocated to each of the plurality of zones. When the block allocator 113 allocates a new memory block to a zone or when the block allocator 113 releases a previously allocated memory block, the zone table controller 112 may update the at least one table such that the block allocation/deallocation is applied thereto.

Under control of the ZNS manager 111, the zone table controller 112 may generate at least one table from results of performing a zone rating and a memory rating. For example, under control of the ZNS manager 111, the zone table controller 112 may generate a first table from a result of performing the zone rating and may generate a second table from a result of performing the memory rating.

Throughout this disclosure, the term "table" may refer to a data structure that can be logically organized as a table with logical rows and logical columns. The actual implementation of the data structure does not require actual rows or columns to be present. The use of the term "table" is not intended to limit the described embodiments to any specific data storage format or arrangement of data.

Under control of the ZNS manager 111, the zone table controller 112 may generate a result table from a result of performing the zone reallocation operation.

Under control of the ZNS manager 111, the zone table controller 112 may generate at least one table from results of performing the zone rating and the memory rating after the generation of the result table.

For example, under control of the ZNS manager 111, the zone table controller 112 may generate a third table from a result of performing the zone rating after the generation of the result table and may generate a fourth table from a result of performing the memory rating after the generation of the result table. In this case, under control of the ZNS manager 111, the zone table controller 112 may update the result table from the third table and the fourth table.

When the storage device 100 is powered off, the zone table controller 112 may store the state information and the plurality of block allocation information in the non-volatile memory devices 120.

The block allocator 113 may allocate at least one memory block to a zone or may release a previously allocated memory block. For example, under control of the ZNS manager 111, the block allocator 113 may allocate at least one memory block to a zone or may release a previously allocated memory block.

The block allocator 113 may perform the zone reallocation operation on zones, to each of which at least one memory block is allocated. For example, under control of the ZNS manager 111, the block allocator 113 may perform the zone reallocation operation on zones, to each of which at least one memory block is allocated, based on results of performing the zone rating and the memory rating.

In some embodiments, under control of the ZNS manager 111, the block allocator 113 may perform the zone reallocation operation such that at least one memory block is allocated to each of the plurality of zones. Each memory block may be allocated to a single zone of the plurality of zones such that a memory block is not allocated to more than a single zone.

In some embodiments, the block allocator 113 may perform the zone reallocation operation depending on an internally defined policy. For example, based on results of performing the zone rating and the memory rating, the block allocator 113 may perform the zone reallocation operation such that there is satisfied a zone reallocation policy for managing an internal temperature of a storage device. When a result of performing the zone reallocation operation indicates that the internal temperature of the storage device increases, it may be determined that the zone reallocation policy is not satisfied. When the result of performing the zone reallocation operation indicates that the internal temperature of the storage device is maintained or decreases, it may be determined that the zone reallocation policy is satisfied.

For example, the zone reallocation policy may be satisfied when the block allocator 113 reallocates blocks of a non-volatile memory device classified as the cold type to a zone classified as the hot zone, when the block allocator 113 reallocates blocks of a non-volatile memory device classified as the hot type to a zone classified as the cold zone, or when the block allocator 113 reallocates blocks of a non-volatile memory device classified as the warm type to a zone classified as the warm zone.

For example, the zone reallocation policy may be satisfied when the block allocator 113 reallocates blocks of a non-volatile memory device classified as the cold type to a zone classified as the warm zone or when the block allocator 113 reallocates blocks of a non-volatile memory device classified as the warm type to a zone classified as the cold zone.

For example, the zone reallocation policy may not be satisfied when the block allocator 113 reallocates blocks of a non-volatile memory device classified as the hot type to a zone classified as the hot zone, when the block allocator 113 reallocates blocks of a non-volatile memory device classified as the warm type to a zone classified as the hot zone, when the block allocator 113 reallocates blocks of a non-volatile memory device classified as the hot type to a zone classified as the warm zone, or when the block allocator 113 reallocates blocks of a non-volatile memory device classified as the cold type to a zone classified as the cold zone.

In some embodiments, the internally defined policy may manage the maximum temperature of the non-volatile memory devices. For example, based on results of performing the zone rating and the memory rating, the block allocator 113 may perform the zone reallocation operation such that there is satisfied a zone reallocation policy for managing the maximum temperature of the non-volatile memory devices. When a result of performing the zone reallocation operation indicates that the maximum temperature of the non-volatile memory devices increases, it may be determined that the zone reallocation policy is not satisfied. When the result of performing the zone reallocation operation indicates that the maximum temperature of the non-volatile memory devices is maintained or decreases, it may be determined that the zone reallocation policy is satisfied.

In some embodiments, under control of the ZNS manager 111, the block allocator 113 may again perform the zone reallocation operation after the zone reallocation operation is performed. For example, under control of the ZNS manager 111, the block allocator 113 may again perform the zone reallocation operation after a reference time passes from a point in time when the zone reallocation operation is performed.

The buffer memory 114a may temporarily store data received from the host 11 or may temporarily store data received from the non-volatile memory devices 120. The buffer memory 114a may assist an operation of copying data stored in a memory block of the non-volatile memory devices 120 to any other memory block thereof.

As described above, according to embodiments of the present disclosure, with regard to a plurality of zones to which a plurality of blocks are allocated, the storage controller 110 may reallocate a block of a non-volatile memory device with a lower temperature to a zone with a higher hit ratio and may reallocate a block of a non-volatile memory device with a higher temperature to a zone of a lower hit ratio.

The non-volatile memory devices 120 may be NAND flash devices, but the present invention is not limited thereto. For example, the non-volatile memory devices 120 may be implemented with one of various storage devices, which retain data stored therein even though a power is turned off, such as a phase-change random access memory (PRAM), a magnetic random access memory (MRAM), a resistive random access memory (RRAM), and a ferroelectric random access memory (FRAM). When the non-volatile memory devices 120 are NAND flash devices, the memory blocks may be the minimum erase unit of the NAND flash device (where all memory cells of a memory block are erased together in a single erase operation).

The non-volatile memory device 120 may include a first-type memory block and a second-type memory block. In some embodiments, the number of bits stored per cell of the first-type memory block may be "1". The number of bits stored per cell of the first-type memory block may be less than the number of bits stored per cell of the second-type memory block. A speed of a write operation for the first-type memory block may be fast. The first-type memory block may be a memory block with high reliability.

In some embodiments, the number of bits stored per cell of the second-type memory block may be 2 or more. A speed of a write operation for the second-type memory block may be relatively slow as compared to the first-type of memory block. The second-type memory block may be a block capable of efficiently storing a large amount of data.

For example, the first-type memory block may be implemented with a single level cell (SLC) storing one bit. The second-type memory block may be implemented with cells which store a plurality of bits, such as a multi-level cell (MLC) storing 2 bits, a triple level cell (TLC) storing 3 bits, and a quadruple level cell (QLC) storing 4 bits. Such cells that are configured to store a plurality of bits may be generically referred to herein as plural-level cells. In some examples, each of the memory blocks may be able to be configured as either a SLC memory block or one of a selected one of the plural-level cell memory blocks. For example, a memory block may be written to according to an SLC program operation that operates at a relatively high speed and provides a larger voltage threshold distribution of the memory cells to represent the data (i.e., "0" or "1") stored in the SLC cells. Later (e.g., after an erase operation), the same memory block may be designated a MLC, TLC or QLC memory block and be written to according to a different corresponding program operation at a relatively lower speed that implements relatively narrower voltage threshold distributions of the memory cells (where different ranges of voltage thresholds of the memory cells represent different data of the memory cell). The control logic block 127 may control the page buffer 123 read and write data to the memory block according to its designation as an SLC, MLC, TLC or QLC memory block.

In some embodiments, the number of memory blocks assigned to one zone may change depending on a type of a memory block. For example, when a memory block is an SLC memory block, 4 SLC memory blocks may be assigned to one zone. When a memory block is an MLC memory block, 2 MLC memory blocks may be assigned to one zone. When a memory block is a QLC memory block, one QLC memory block may be assigned to one zone.

The plurality of temperature sensors 130 may be configured to sense ambient temperatures, surface temperatures, and/or internal temperatures of the non-volatile memory devices 120, respectively. The plurality of temperature sensors 130 may transmit temperature information to the storage controller 110 based on the sensed temperatures.

Figure 2:
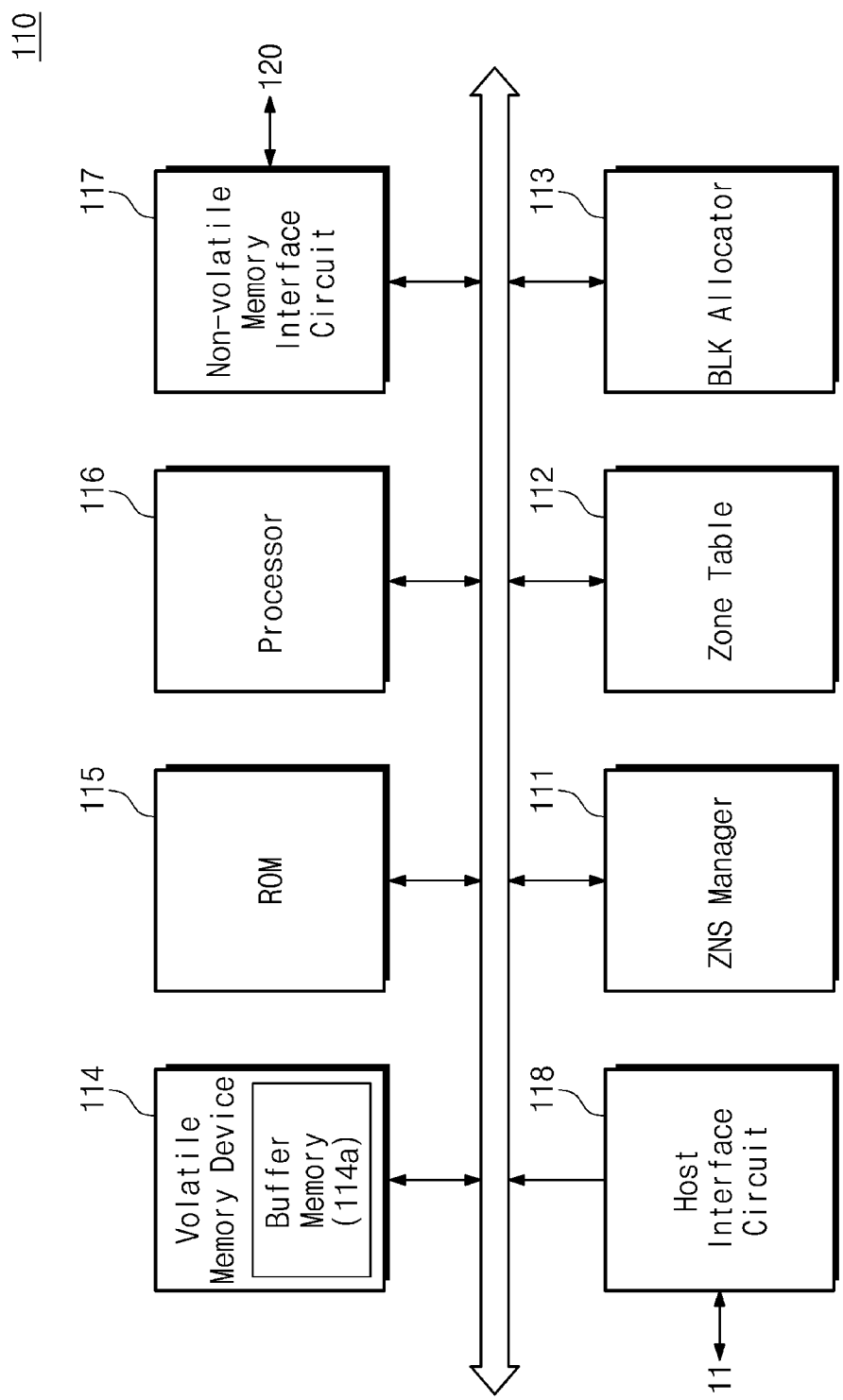
FIG. 2 is a block diagram illustrating a storage controller according to an embodiment of the present disclosure.

FIG. 2 is a block diagram illustrating the storage controller 110 of FIG. 1 in detail, according to an embodiment of the present disclosure. Referring to FIGS. 1 and 2, the storage controller 110 may communicate with the host 11 and the non-volatile memory devices 120.

The storage controller 110 may include the ZNS manager 111, the zone table controller 112, the block allocator 113, a volatile memory device 114, a read only memory (ROM) 115, a processor 116, a non-volatile memory interface circuit 117, and a host interface circuit 118. Each of the ZNS manager 111, the zone table controller 112, the block allocator 113, the volatile memory device 114, the read only memory (ROM) 115, the processor 116, the non-volatile memory interface circuit 117, and the host interface circuit 118 may be physically separated into two or more interacting and discrete units without departing from the scope of the inventive concepts. Further, the ZNS manager 111, the zone table controller 112, the block allocator 113, the volatile memory device 114, the read only memory (ROM) 115, the processor 116, the non-volatile memory interface circuit 117, and the host interface circuit 118 may be physically combined into more complex blocks, units and/or modules without departing from the scope of the inventive concepts.

In some embodiments, the ZNS manager 111, the zone table controller 112, and the block allocator 113 may be implemented by firmware. For example, the non-volatile memory devices 120 may store instructions corresponding to the ZNS manager 111, the zone table controller 112, and the block allocator 113. The processor 116 may load the instructions of the non-volatile memory devices 120 to the volatile memory device 114. The processor 116 may execute the loaded instructions to operate the ZNS manager 111, the zone table controller 112, and the block allocator 113. In some embodiments, at least one of the ZNS manager 111, the zone table controller 112, and the block allocator 113 may be implemented by dedicated hardware, or as a combination of dedicated hardware to perform some functions and a processor (e.g., one or more programmed microprocessors and associated circuitry) to perform other functions.

The volatile memory device 114 may include the buffer memory 114a. The volatile memory device 114 may be used as a main memory, a cache memory, or a working memory of the storage controller 110, as well as the buffer memory 114a. For example, the volatile memory device 114 may be implemented with a static random access memory (SRAM), a dynamic random access memory (DRAM), etc.

The ROM 115 may be used as a read only memory that stores information necessary for the operation of the storage controller 110. The processor 116 may control an overall operation of the storage controller 110.

The storage controller 110 may communicate with the host 11 through the host interface circuit 118. In some embodiments, the host interface circuit 118 may be implemented based on at least one of various interfaces such as a serial ATA (SATA) interface, a peripheral component interconnect express (PCIe) interface, a serial attached SCSI (SAS), a non-volatile memory express (NVMe) interface, and a universal flash storage (UFS) interface. Also, the host interface circuit 118 may support the NVMe ZNS standard.

The storage controller 110 may communicate with the non-volatile memory devices 120 through the non-volatile memory interface circuit 117. In some embodiments, the non-volatile memory interface circuit 117 may be implemented based on a NAND interface. Also, the non-volatile memory interface circuit 117 may support a sequential write operation that complies with the NVMe ZNS standard.

Figure 3:
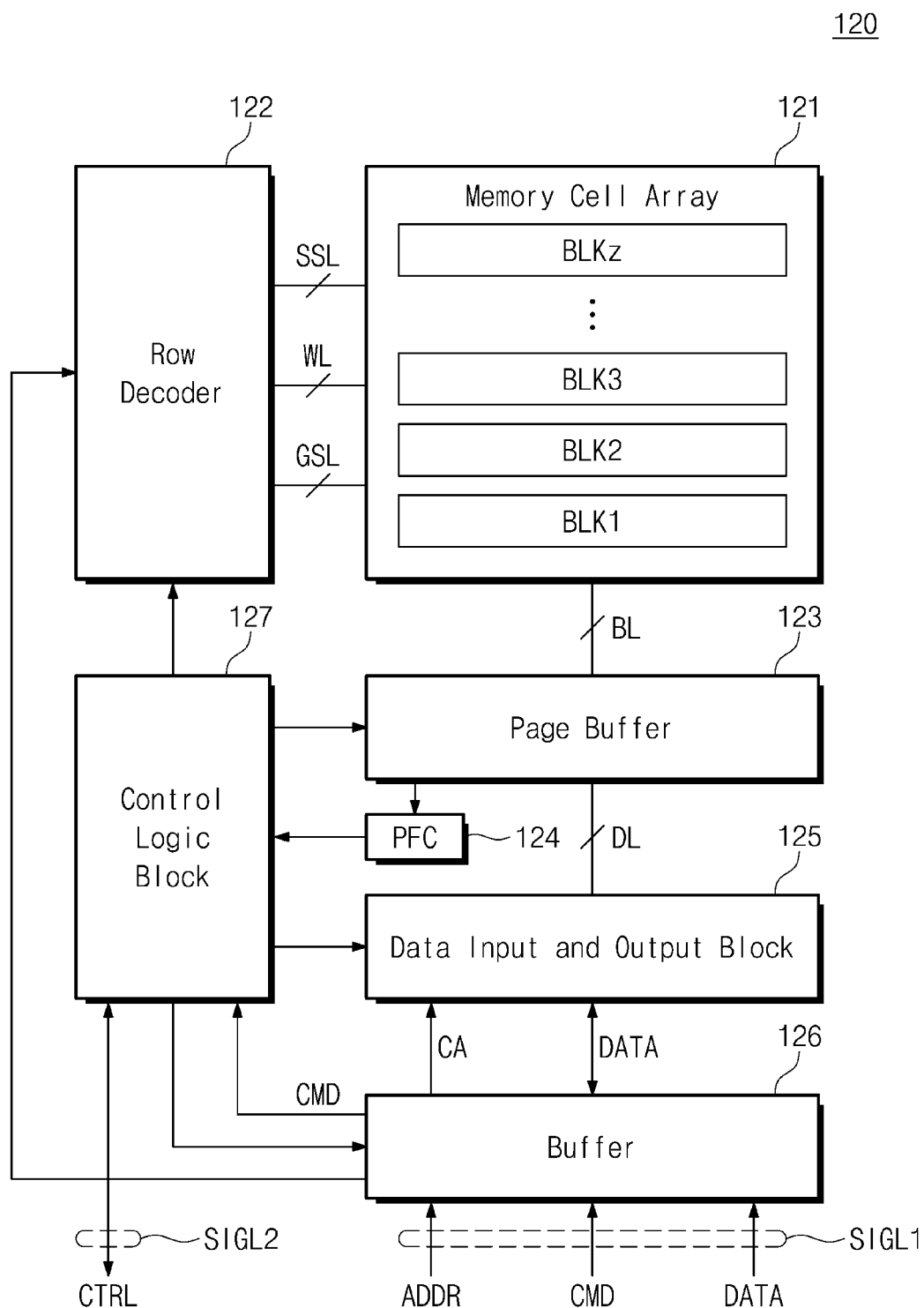
FIG. 3 is a block diagram illustrating a non-volatile memory device according to an embodiment of the present disclosure.

FIG. 3 is a block diagram illustrating the non-volatile memory device 120 of FIG. 1 in detail, according to an embodiment of the present disclosure. Referring to FIGS. 1 and 3, the non-volatile memory device 120 may communicate with the storage controller 110. The non-volatile memory device 120 may communicate with the storage controller through the non-volatile memory interface circuit 117 which may be connected to the non-volatile memory device 120 through the first signal lines SIGL1 and the second signal lines SIGL2 shown in FIG. 1. The non-volatile memory interface circuit 117 may transmit and receive control signals and data signals over the first signal lines SIGL1 and the second signal lines SIGL2 to communicate with the non-volatile memory device 120.

The non-volatile memory device 120 may include a memory cell array 121, a row decoder 122, a page buffer 123, a pass/fail check block (circuit) (PFC) 124, a data input and output block (circuit) 125, a buffer 126, and a control logic block (circuit) 127.

The memory cell array 121 includes a plurality of memory blocks BLK1 to BLKz, each of which includes a plurality of memory cells. Each of the memory blocks BLK1 to BLKz may be connected to the row decoder 122 through at least one ground selection line GSL, word lines WL, and at least one string selection line SSL. Some of the word lines WL may be used as dummy word lines. As used herein, the term "dummy" is used to refer to a component that has the same or similar structure and shape as other components but does not have a substantial function. For example, a dummy word line may not connect to memory cells, or may have dummy memory cells connected to it (where no data is read from the dummy memory cells). Each of the memory blocks BLK1 to BLKz may be communicatively connected to the page buffer 123 through a plurality of bit lines BL. The plurality of memory blocks BLK1 to BLKz may be connected in common to the plurality of bit lines BL.

In an embodiment, each of the plurality of memory blocks BLK1 to BLKz may be a unit corresponding to an erase operation (e.g., a group of memory cells that are erased in the same erase operation). Hereafter, "K" will refer to an arbitrary natural number for purposes of discussion. Memory cells belonging to each memory block may be erased at the same time (e.g., the memory cells belonging to a particular memory block may all be erased together in the same erase operation). As another example, each of the memory blocks BLK1 to BLKz may be divided into a plurality of sub-blocks. Each of the plurality of sub-blocks may correspond to a unit of the erase operation. Memory cells belonging to each sub-block may be erased at the same time (e.g., the memory cells belonging to a particular sub-block may all be erased as the same erase operation). Below, the unit of the erase operation is referred to as an "erase unit". The erase unit may be a memory block or a sub-block. The erase unit may be the minimum unit of erasure (i.e., the smallest amount of memory cells that may be erased in an erase operation).

Each memory block may include a plurality of pages and constitute all the pages in a contiguous physical section of the memory device. The plurality of pages may be respectively connected to the word lines WL. Each of the pages may be a unit of the write operation (e.g., a group of memory cells that can be written to in the same write operation). The unit of the write operation is referred to as a "write unit".

Bits that are written in memory cells of one page may constitute logical pages. When three bits are written in one memory cell, one physical page may include (i.e., store) three logical pages. When one bit is written in one memory cell, one physical page may include one logical page. The logical page, the logical pages, or the physical page may be a unit of the read operation (e.g., a group of memory cells that can be read in the same read operation). The unit of the read operation is referred to as a "read unit".

The row decoder 122 is connected to the memory cell array 121 through the ground selection lines GSL, the word lines WL, and the string selection lines SSL. The row decoder 122 operates under control of the control logic block 127.

The row decoder 122 may decode a row address RA received from the buffer 126 and may control voltages to be applied to the string selection lines SSL, the word lines WL, and the ground selection lines GSL based on the decoded row address.

The page buffer 123 is connected to the memory cell array 121 through the plurality of bit lines BL. The page buffer 123 is connected to the data input and output block 125 through a plurality of data lines DL. The page buffer 123 operates under control of the control logic block 127.

In a program operation for the memory cell array 121, the page buffer 123 may store data to be written in memory cells. The page buffer 123 may apply voltages to the plurality of bit lines BL based on the stored data. In a read operation or in a verify read operation that is performed in the program operation or the erase operation, the page buffer 123 may sense voltages of the bit lines BL and may store a sensing result.

In the verify read operation associated with the program operation or the erase operation, the pass/fail check block 124 may verify the sensing result of the page buffer 123. For example, in the verify read operation associated with the program operation, the pass/fail check block 124 may count the number of values (e.g., the number of 0s) respectively corresponding to on-cells that are not programmed to a target threshold voltage or more.

In the verify read operation associated with the erase operation, the pass/fail check block 124 may count the number of values (e.g., the number of 1s) respectively corresponding to off-cells that are not erased to a target threshold voltage or less. When the counting result is greater than or equal to a threshold value, the pass/fail check block 124 may output a signal indicating a fail to the control logic block 127. When the counting result is smaller than the threshold value, the pass/fail check block 124 may output a signal indicating a pass to the control logic block 127. Depending on a verification result of the pass/fail check block 124, a program loop of the program operation may be further performed, or an erase loop of the erase operation may be further performed.

The data input and output block 125 is connected to the page buffer 123 through the plurality of data lines DL. The data input and output block 125 may receive a column address CA from the buffer 126. The data input and output block 125 may output data read by the page buffer 123 to the buffer 126 depending on the column address CA. The data input and output block 125 may provide data received from the buffer 126 to the page buffer 123, based on the column address CA.

Through the first signal lines SIGL1, the buffer 126 may receive a command CMD and an address ADDR from an external device and may exchange data "DATA" with the external device. The buffer 126 may operate under control of the control logic block 127. The buffer 126 may provide the command CMD to the control logic block 127. The buffer 126 may provide a row address RA of the address ADDR to the row decoder 122 and may provide a column address CA of the address ADDR to the data input and output block 125. The buffer 126 may exchange the data "DATA" with the data input and output block 125.

The control logic block 127 may exchange a control signal CTRL with the external device through the second signal lines SIGL2. The control logic block 127 may allow the buffer 126 to route the command CMD, the address ADDR, and the data "DATA". The control logic block 127 may decode the command CMD received from the buffer 126 and may control the non-volatile memory device 120 based on the decoded command.

In an embodiment, the non-volatile memory device 120 may be manufactured using a bonding method. The memory cell array 121 may be manufactured by using a first wafer, and the row decoder 122, the page buffer 123, the data input and output block 125, the buffer 126, and the control logic block 127 may be manufactured by using a second wafer. The non-volatile memory device 120 may be implemented by coupling the first wafer and the second wafer such that an upper surface of the first wafer and an upper surface of the second wafer face each other.

As another example, the non-volatile memory device 120 may be manufactured using a cell over peri (COP) method. A peripheral circuit including the row decoder 122, the page buffer 123, the data input and output block 125, the buffer 126, and the control logic block 127 may be implemented on a substrate. The memory cell array 121 may be implemented over the peripheral circuit. The peripheral circuit and the memory cell array 121 may be connected by using through vias.

A conventional storage controller may store data in a random access distribution. For example, in the case where data are stored in a random access distribution, memory blocks corresponding to logically sequential address blocks may be randomly distributed in a non-volatile memory device. The non-volatile memory device may be incapable of being overwritten in structure (e.g., the randomly distributed memory blocks may not be erased individually, or the location of the randomly distributed memory block may not be changed). In the case of performing an erase operation, a garbage collection operation in which data are read and are then copied to another memory block may be performed to individually manage valid data and invalid data in a memory block.

The conventional storage controller may frequently perform the garbage collection operation on the entire region of the non-volatile memory device, thereby reducing the lifetime of the non-volatile memory device (e.g., increasing the number of program/erase (P/E) cycles). Also, as a large over-provisioning (OP) region is allocated for frequent garbage collection, wear leveling, and bad block management, an available storage capacity of the non-volatile memory device may be decreased.

Figure 4:
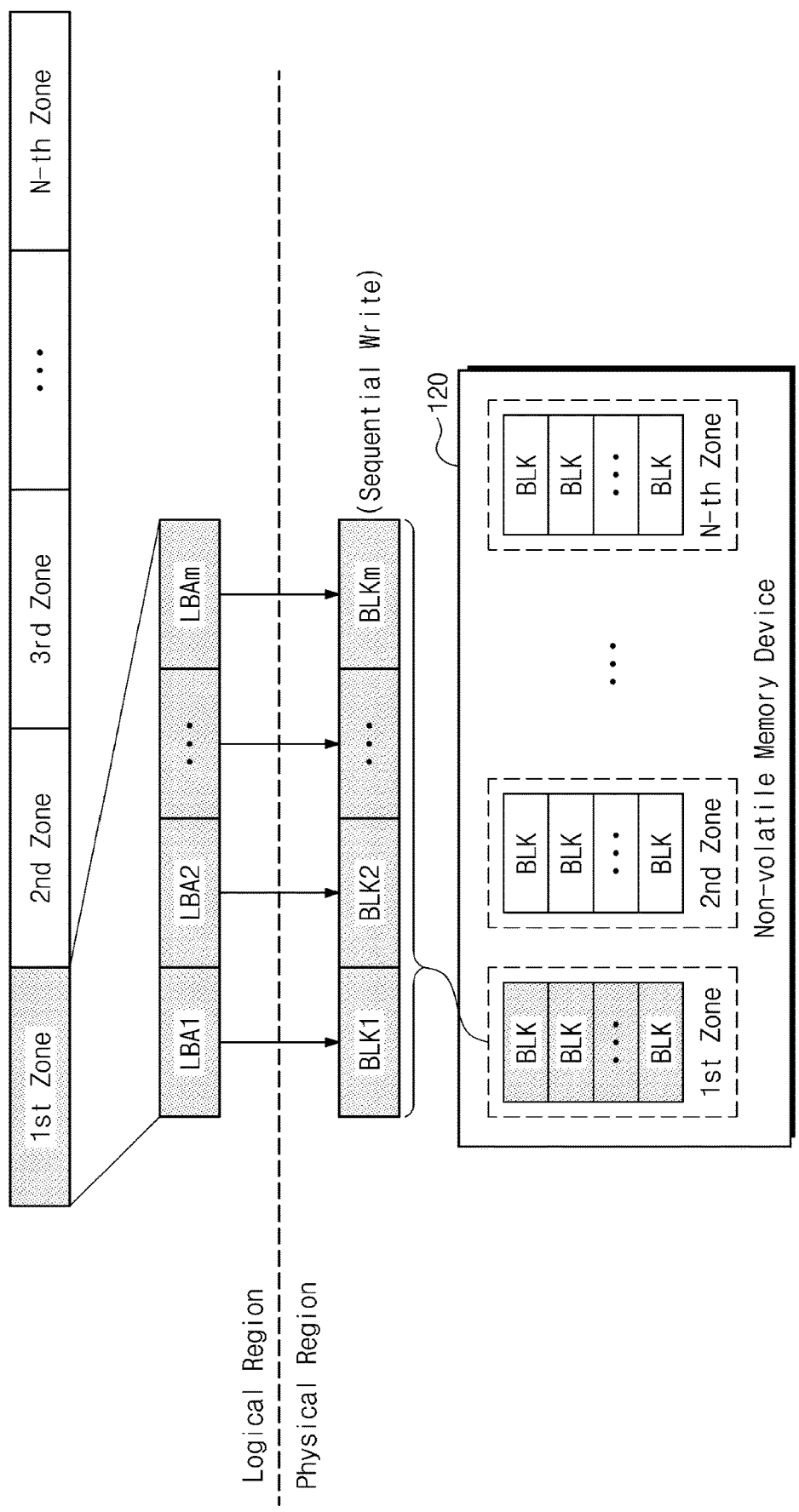
FIG. 4 is a diagram describing a sequential write operation according to embodiments of the present disclosure.

FIG. 4 is a diagram describing a sequential write operation according to some embodiments of the present disclosure. An operation in which the storage controller 110 sequentially writes data in the non-volatile memory device 120 will be described with reference to FIGS. 1 and 4.

According to embodiments of the present disclosure, the storage controller 110 may perform the sequential write operation. For better understanding of the present disclosure, a logical region of first to N-th zones and a physical region of first to N-th zones are illustrated together. Herein, "N" is an arbitrary natural number. The logical region may include addresses capable of being identified by the host 11. The physical region may include locations or addresses of memory blocks in the non-volatile memory device 120. The logical region and the physical region may have a mapping relationship.

Referring to the logical region, the storage controller 110 may manage the first to N-th zones. The first to N-th zones may be managed independently of each other. For example, the host 11 may execute a first application and a second application. The first application may manage data included in the first zone. The second application may manage data included in the second zone. That is, data having similar purposes and use periods from among the data managed by the same application may be managed within the same zone.

Each of the first to N-th zones may include a plurality of logical block addresses. For example, the first zone may include first to m-th logical block addresses LBA1 to LBAm. Herein, "m" is an arbitrary natural number. The first to m-th logical block addresses LBA1 to LBAm may be logically sequential.

The storage controller 110 may sequentially store data in the non-volatile memory device 120 by using a write pointer. For example, in the case where data corresponding to the first logical block address LBA1 and data corresponding to the second logical block address LBA2 have been sequentially programmed in the non-volatile memory device 120 and the buffer memory 114a of the storage controller 110 currently stores data corresponding to the third logical block address LBA3, the write pointer may indicate the third logical block address LBA3.

Referring to the physical region, the non-volatile memory device 120 may include a plurality of blocks BLK. The plurality of blocks BLK may be classified into the first to N-th zones. The plurality of blocks BLK of the first zone may be first to m-th block BLK1 to BLKm that are physically sequential. The first to m-th block BLK1 to BLKm of the first zone may respectively correspond to the first to m-th logical block addresses LBA1 to LBAm of the first zone. The storage controller 110 may allow data corresponding to a write request from the host 11 to be stored in the non-volatile memory device 120 logically and physically sequentially. That is, the storage controller 110 may support the sequential write operation.

For better understanding of the present disclosure, the description is given as a logical block address corresponding to one block, but the present invention is not limited thereto. Logical block addresses may respectively correspond to sequential sub-blocks in one block or sequential programming units (e.g., a unit by which memory cells are programmed), while maintaining the logical serializability. The correspondence relationship of the logical block address and the memory block may be variously changed (e.g., by changing the mapping of logical block addresses to physical block addresses0 and carried out by one skilled in the art.

As described above, according to some embodiments of the present disclosure, the storage controller 110 may manage data in units of zones, instead of managing data with respect to the entire region of the non-volatile memory device 120. As data management is made in units of zones, the I/O load and additional read and write operations due to garbage collection (GC) may decrease. Accordingly, a data processing speed of the storage device 100 may be improved, and the power consumption of the storage device 100 may decrease. Also, as the load due to the garbage collection decreases, the over-provisioning (OP) region may be reduced. This may mean that an available storage capacity of the non-volatile memory device 120 increases.

Figure 5:
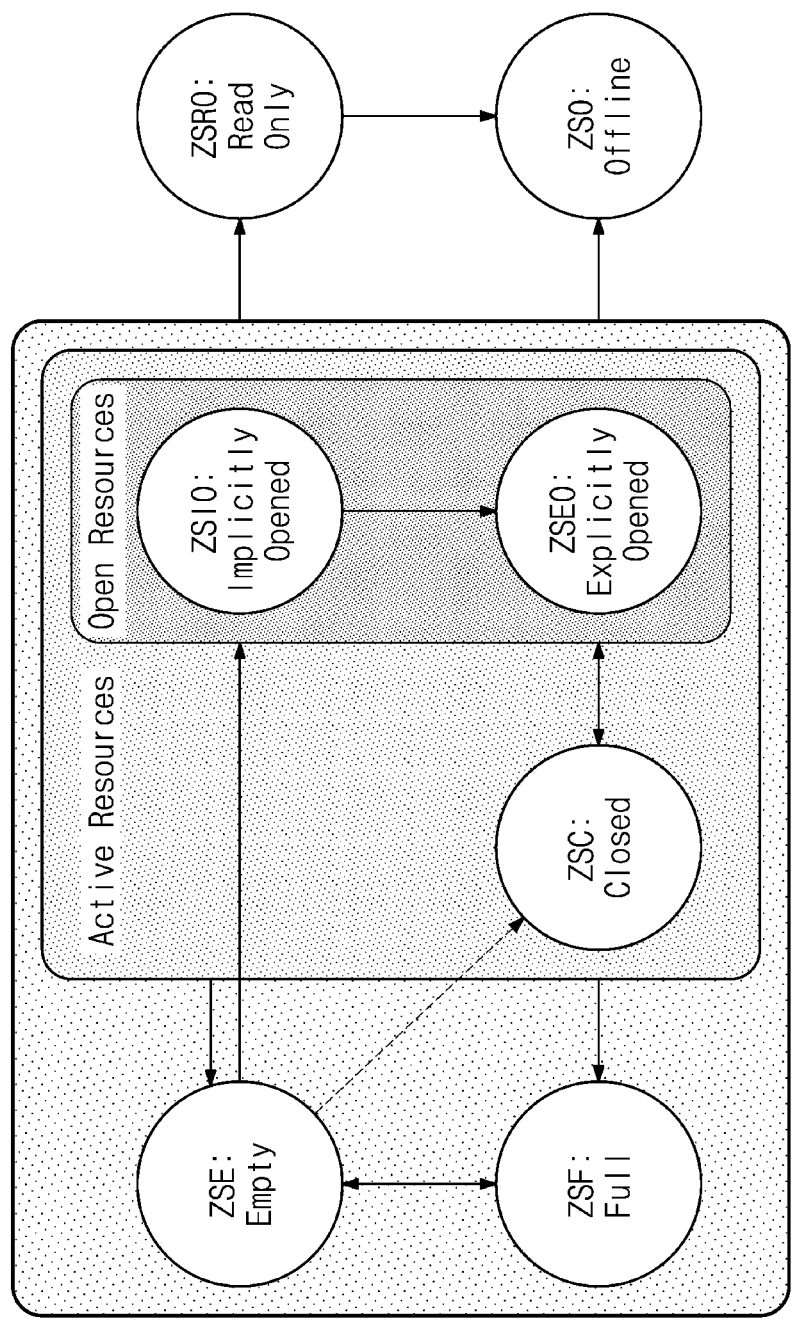
FIG. 5 is a diagram describing states of a storage device according to embodiments of the present disclosure.

FIG. 5 is a diagram describing states of a storage device according to some embodiments of the present disclosure. A state machine associated with zones of the storage device 100 according to the ZNS standard will be described with reference to FIGS. 1 and 5.

According to embodiments of the present disclosure, zones managed by the storage device 100 may have one of a ZSE state, a ZSIO state, a ZSEO state, a ZSC state, a ZSF state, a ZSRO state, and a ZSO state. As the storage device 100 processes a request received from the host 11, a state of a zone may transition.

The ZSE state, the ZSF state, the ZSRO state, and the ZSO state may be classified as a non-active state. The ZSIO state, the ZSEO state, and the ZSC state may be classified as an active state. Zones of the active state may be limited by a maximum active resources field. The ZSIO state and the ZSEO state may be classified as an open state. Zones of the open state may be limited by a maximum open resources field.

The ZSE state may indicate an empty state. In the ZSE state, data may not be yet stored in memory blocks, and the write pointer may indicate the lowest logical block address (e.g., a logical block address having the smallest number from among logical block addresses managed by a zone). The write pointer of the ZSE state may be valid. The ZSE state may transition to one of the ZSIO state, the ZSEO state, the ZSC state, and the ZSF state.

The ZSIO state may indicate an implicitly opened state. The ZSIO may be a state implicitly opened by executing a write command received from the host 11. In the ZSIO state, a memory block may store data corresponding to the write command. The ZSIO state may transition to one of the ZSE state, the ZSEO state, the ZSC state, and the ZSF state. When an open resource is saturated, the ZSIO state may transition to the ZSC state even though there is no close command.

The ZSEO state may indicate an explicitly opened state. The ZSEO state may be a state explicitly opened by executing an open command received from the host 11. In the ZSEO state, a memory block may store data corresponding to the write command after the write command is subsequently received. The ZSEO state may transition to one of the ZSE state, the ZSC state, and the ZSF state. The ZSEO state may have a higher priority to an open resource than the ZSIO state. The ZSEO may transition to the ZSC only by the close command.

The ZSC state may indicate a closed state. The transition to the ZSC state may be made 1) when, in the ZSE state, usable active resources are present and a set zone descriptor extension command is received, 2) when, in the ZSIO state, the close command is received or an open resource is saturated, or 3) when, in the ZSEO state, the close command is received. In the ZSC state, a memory block may not store data corresponding to the write command. The ZSC state may transition to one of the ZSE state, the ZSIO state, the ZSEO state, and the ZSF state.

The ZSF state may indicate a full state. In the ZSE state, memory blocks may be filled with data stored therein, and the write pointer may indicate the highest logical block address (e.g., a logical block address having the greatest number from among logical block addresses managed by a zone). The write pointer of the ZSF state may be invalid. The ZSF state may transition to the ZSE state by a reset zone command.

The ZSRO state may indicate a read only state. The ZSRO state may be a space where a host continues to use a zoned namespace after a portion of performance of a zone stops an operation. The ZSRO state may transition to the ZSO state by an offline zone command.

The ZSO state may indicate an offline state. The ZSO state may not have a valid write pointer, may not have active resources, and may not have open resources. The ZSO state may not have any other state capable of transitioning.

In some embodiments, the storage device 100 may process a state transition request for a device open. The device open may include a state in which the storage device 100 is capable of receiving data from the host 11. For example, the state transition request for the device open may indicate the transition to the ZSIO state or the ZSIO state.

In some embodiments, the storage device 100 may manage the active state. The active state may include the ZSIO state, the ZSEO state, and the ZSC state.

Figure 6:
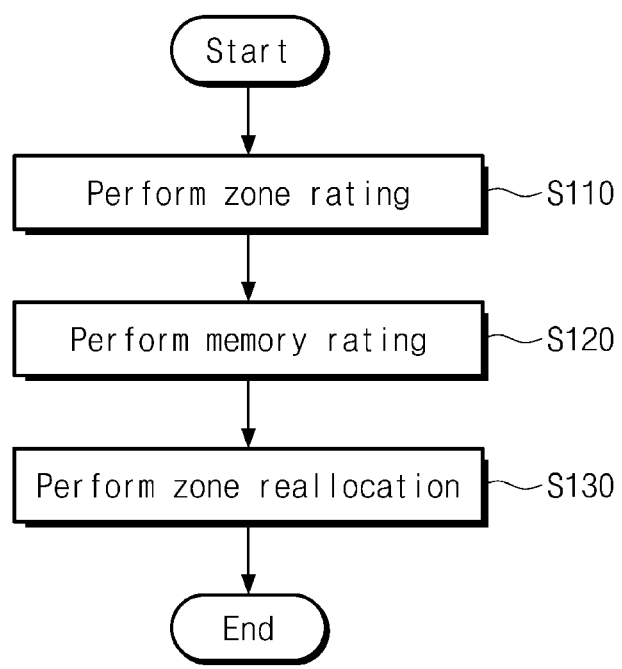
FIG. 6 is a flowchart illustrating an operating method of a storage controller according to an embodiment of the present disclosure.

FIG. 6 is a flowchart illustrating an operating method of the storage controller 110 according to an embodiment of the present disclosure. Referring to FIGS. 1 and 6, in operation S110, the storage controller 110 may perform a zone rating for generating a first table in which identifiers of a plurality of zones are sorted, based on hit ratio information of the plurality of zones. For example, the storage controller 110 may perform the zone rating based on the hit ratio information for the plurality of zones such that the identifiers of the plurality of zones are sorted. The storage controller 110 may generate and store the first table from a result of performing the zone rating.

In some embodiments, the ZNS manager 111 may perform the zone rating based on a reallocation request of the host 11.

In some embodiments, the ZNS manager 111 may perform the zone rating after a reference time passes from a previous point in time when a plurality of blocks were allocated to the plurality of zones (e.g., previously allocated).

In operation S120, the storage controller 110 may perform a memory rating for generating a second table in which identifiers of a plurality of non-volatile memory devices are sorted, based on of temperature information received from the plurality of temperature sensors 130. For example, the storage controller 110 may perform the memory rating based on the temperature information received from the plurality of temperature sensors 130 such that the identifiers of the plurality of non-volatile memory devices are sorted (e.g., sorted according to the temperate of each corresponding non-volatile memory device). The storage controller 110 may generate and store the second table from a result of performing the memory rating.

In some embodiments, the ZNS manager 111 may perform the memory rating while performing the zone rating (e.g., the ZNS manager 111 may perform the memory rating and the zone rating in parallel).

In operation S130, the storage controller 110 may perform a zone reallocation operation for generating a result table, based on the first table and the second table. For example, with regard to the plurality of zones to which the plurality of blocks are allocated, based on the first table and the second table, the storage controller 110 may reallocate a block of a non-volatile memory device with a lower temperature to a zone with a higher hit ratio and may reallocate a block of a non-volatile memory device with a higher temperature to a zone with a lower hit ratio. The storage controller 110 may generate and store the result table from a result of performing the zone reallocation operation.

FIGS. 7A to 7C are diagrams describing a zone reallocation operation according to an embodiment of the present disclosure. Referring to FIGS. 1, 6, and 7A to 7C, the storage controller 110 may perform a zone rating for generating the first table, may perform a memory rating for generating the second table, and may perform a zone reallocation operation for generating the result table.

In FIGS. 7A to 7C, a plurality of zones, to each of which at least one block is allocated, may include first to sixth zones Z1 to Z6, the non-volatile memory devices 120 may include the first to third non-volatile memory devices NVM1, NVM2, and NVM3, the first non-volatile memory device NVM1 may include first and second memory blocks BLK1_1 and BLK1_2, the second non-volatile memory device NVM2 may include first and second memory blocks BLK2_1 and BLK2_2, and the third non-volatile memory device NVM3 may include first and second memory blocks BLK3_1 and BLK3_2.

Referring to FIGS. 1, 6, and 7A, the storage controller 110 may perform the zone rating for generating the first table based on hit ratio information of the plurality of zones Z1 to Z6 such that identifiers ID_Zone of the plurality of zones Z1 to Z6 are sorted.

By performing the zone rating, the storage controller 110 may sort the plurality of zones Z1 to Z6 such that a zone with a high hit ratio has a first identifier Rate1 and a zone with a low hit ratio has a sixth identifier Rate6.

As a result of performing the zone rating, the fourth zone Z4 may have the first identifier Rate1, the first zone Z1 may have a second identifier Rate2, the fifth zone Z5 may have a third identifier Rate3, the second zone Z2 may have a fourth identifier Rate4, the sixth zone Z6 may have a fifth identifier Rate5, and the third zone Z3 may have the sixth identifier Rate6.

As a result of performing the zone rating, the storage controller 110 may classify the first zone Z1 and the fourth zone Z4 as the hot zone, may classify the second zone Z2 and the fifth zone Z5 as the warm zone, and may classify the third zone Z3 and the sixth zone Z6 as the cold zone.

Referring to FIGS. 1, 6, and 7B, the storage controller 110 may perform the memory rating for generating the second table based on temperature information received from the plurality of temperature sensors 130 such that identifiers ID_Memory of a plurality of non-volatile memory devices are sorted.

By performing the memory rating, the storage controller 110 may sort the non-volatile memory devices NVM1, NVM2, and NVM3 such that a non-volatile memory device whose temperature is low has a first identifier Rate1 and a non-volatile memory device whose temperature is high has a third identifier Rate3.

As a result of performing the memory rating, the second non-volatile memory device NVM2 may have the first identifier Rate1, the third non-volatile memory device NVM3 may have a second identifier Rate2, and the first non-volatile memory device NVM1 may have the third identifier Rate3.

As a result of performing the memory rating, the storage controller 110 may classify the first non-volatile memory device NVM1 as the hot type, may classify the second non-volatile memory device NVM2 as the cold type, and may classify the third non-volatile memory device NVM3 as the warm type.

Referring to FIGS. 1, 6, and 7C, the storage controller 110 may perform the zone reallocation operation for generating the result table, based on the first table and the second table. The storage controller 110 may reallocate a block of a non-volatile memory device with a lower temperature to a zone with a higher hit ratio and may reallocate a block of a non-volatile memory device with a higher temperature to a zone with a lower hit ratio.

In some embodiments, based on results of performing the zone rating and the memory rating, the storage controller 110 may perform the zone reallocation operation such that there is satisfied the zone reallocation policy for managing an internal temperature of a storage device. When a result of performing the zone reallocation operation indicates that the internal temperature of the storage device increases, it may be determined that the zone reallocation policy is not satisfied. When the result of performing the zone reallocation operation indicates that the internal temperature of the storage device is maintained or decreases, it may be determined that the zone reallocation policy is satisfied.

In some embodiments, based on results of performing the zone rating and the memory rating, the storage controller 110 may perform the zone reallocation operation such that there is satisfied the zone reallocation policy for managing a maximum temperature of the plurality of non-volatile memory devices. When a result of performing the zone reallocation operation indicates that maximum temperature of the plurality of non-volatile memory devices may increase above a predetermined set temperature, it may be determined that the zone reallocation policy is not satisfied. When the result of performing the zone reallocation operation indicates that the maximum temperature of the plurality of non-volatile memory devices is maintained below the predetermined set temperature or decreases, it may be determined that the zone reallocation policy is satisfied.

For example, the storage controller 110 may reallocate one (e.g., BLK2_1) of blocks of the second non-volatile memory device NVM2 classified as the cold type to the fourth zone Z4 classified as the hot zone and may reallocate one (e.g., BLK2_2) of the blocks of the second non-volatile memory device NVM2 classified as the cold type to the first zone Z1 classified as the hot zone.

For example, the storage controller 110 may reallocate one (e.g., BLK3_1) of blocks of the third non-volatile memory device NVM3 classified as the warm type to the fifth zone Z5 classified as the warm zone and may reallocate one (e.g., BLK3_2) of the blocks of the third non-volatile memory device NVM3 classified as the warm type to the second zone Z2 classified as the warm zone.

For example, the storage controller 110 may reallocate one (e.g., BLK1_1) of blocks of the first non-volatile memory device NVM1 classified as the hot type to the sixth zone Z6 classified as the cold zone and may reallocate one (e.g., BLK1_2) of the blocks of the first non-volatile memory device NVM1 classified as the hot type to the third zone Z3 classified as the cold zone.

Figure 8:
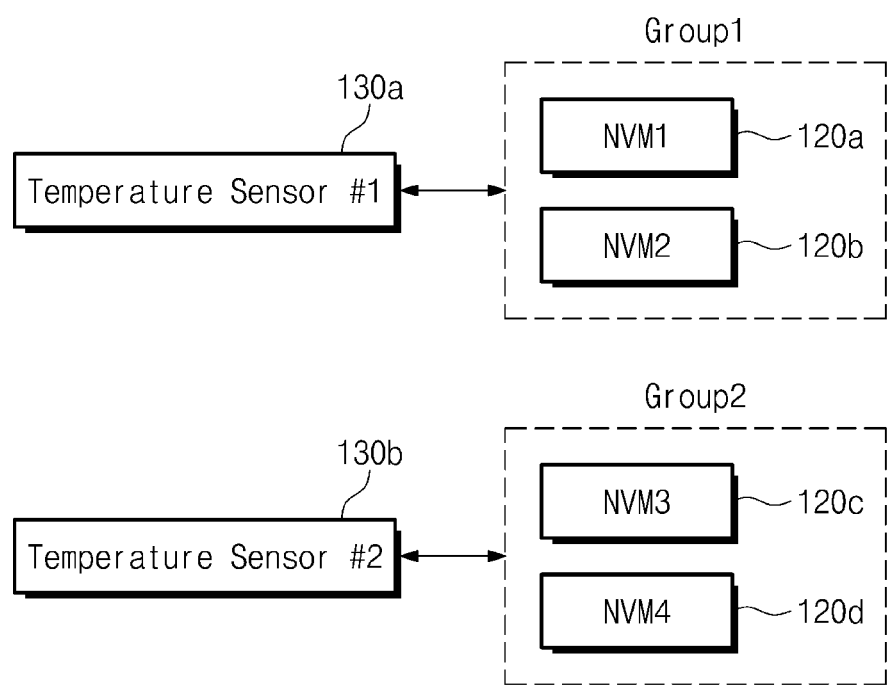
FIG. 8 is a block diagram illustrating a storage device according to an embodiment of the present disclosure.

FIG. 8 is a block diagram illustrating the storage device 100 according to an embodiment of the present disclosure. Referring to FIGS. 1 and 8, the plurality of temperature sensors 130 may include a first temperature sensor 130a and a second temperature sensor 130b, a first group Group1 may include a first non-volatile memory device (NVM1) 120a and a second non-volatile memory device (NVM2) 120b, and a second group Group2 may include a third non-volatile memory device (NVM3) 120c and a fourth non-volatile memory device (NVM4) 120d.

The first temperature sensor 130a may sense a temperature of the first group Group1, and the second temperature sensor 130b may sense a temperature of the second group Group2.

The first temperature sensor 130a may transmit temperature information about the first group Group1 to the storage controller 110 based on the sensed temperature, and the second temperature sensor 130b may transmit temperature information about the second group Group2 to the storage controller 110 based on the sensed temperature.

The storage controller 110 may perform the memory rating on the first group Group1 and the second group Group2 based on the temperature information received from the first and second temperature sensors 130a and 130b.

Figure 9B:
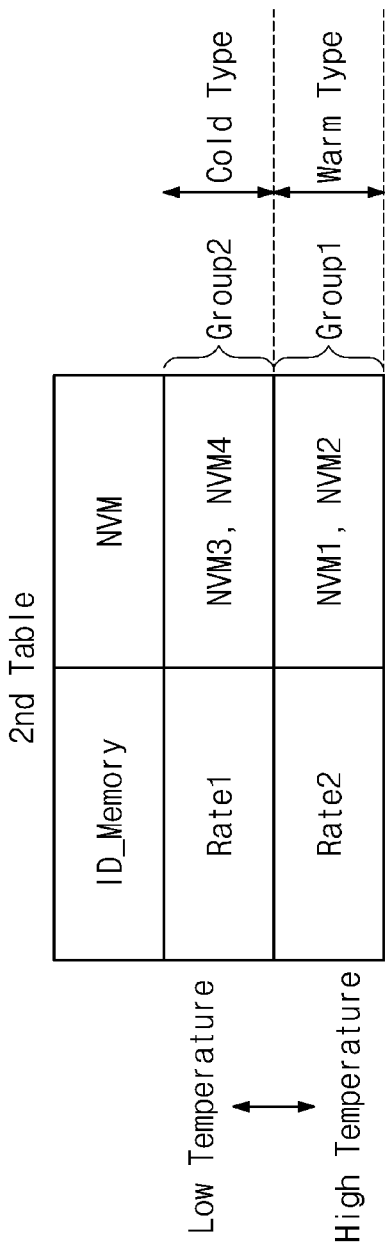
Figure 9C:
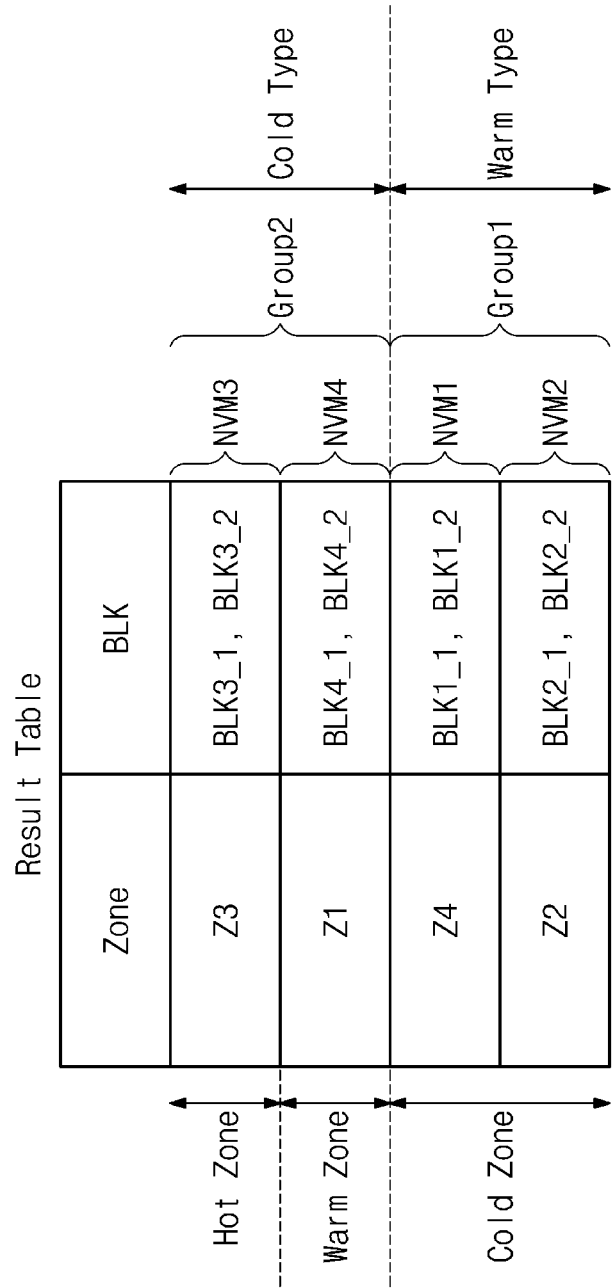

FIGS. 9A to 9C are diagrams describing a zone reallocation operation according to an embodiment of the present disclosure. Referring to FIGS. 1, 6, and 9A to 9C, the storage controller 110 may perform a zone rating for generating the first table, may perform a memory rating for generating the second table, and may perform the zone reallocation operation for generating the result table.

In FIGS. 9A to 9C, a plurality of zones to each of which at least one block is allocated may include the first to fourth zones Z1 to Z4, the first group Group1 may include the first non-volatile memory device NVM1 and the second non-volatile memory device NVM2, and the second group Group2 may include the third non-volatile memory device NVM3 and the fourth non-volatile memory device NVM4. The first non-volatile memory device NVM1 may include first and second memory blocks BLK1_1 and BLK1_2, the second non-volatile memory device NVM2 may include first and second memory blocks BLK2_1 and BLK2_2, the third non-volatile memory device NVM3 may include first and second memory blocks BLK3_1 and BLK3_2, and the fourth non-volatile memory device NVM4 may include first and second memory blocks BLK4_1 and BLK4_2.

Referring to FIGS. 1, 6, 8, and 9A, the storage controller 110 may perform the zone rating for generating the first table based on hit ratio information of the plurality of zones Z1 to Z4 such that the identifiers ID_Zone of the plurality of zones Z1 to Z4 are sorted.

By performing the zone rating, the storage controller 110 may sort the plurality of zones Z1 to Z4 such that a zone with a high hit ratio has a first identifier Rate1 and a zone with a low hit ratio has a fourth identifier Rate4.

As a result of performing the zone rating, the third zone Z3 may have the first identifier Rate1, the first zone Z1 may have a second identifier Rate2, the fourth zone Z4 may have a third identifier Rate3, and the second zone Z2 may have the fourth identifier Rate4.

As a result of performing the zone rating, the storage controller 110 may classify the first zone Z1 as the warm, may classify the third zone Z3 as the hot zone, and may classify the second zone Z2 and the fourth zone Z4 as the cold zone.

Referring to FIGS. 1, 6, 8, and 9B, the storage controller 110 may perform the memory rating for generating the second table based on temperature information received from the plurality of temperature sensors 130 such that the identifiers ID_Memory of first and second groups are sorted.

By performing the memory rating, the storage controller 110 may sort the non-volatile memory devices NVM1, NVM2, NVM3, and NVM4 such that non-volatile memory devices of a group whose temperature is low have a first identifier Rate1 and non-volatile memory devices of a group whose temperature is high have a second identifier Rate2.

As a result of performing memory rating, the third and fourth non-volatile memory devices NVM3 and NVM4 belonging to the second group Group2 may have the first identifier Rate1, and the first and second non-volatile memory devices NVM1 and NVM2 belonging to the first group Group1 may have the second identifier Rate2.

As a result of performing memory rating, the storage controller 110 may classify the first and second non-volatile memory devices NVM1 and NVM2 belonging to the first group Group1 as the warm type and may classify the third and fourth non-volatile memory devices NVM3 and NVM4 belonging to the second group Group2 as the cold type.

Referring to FIGS. 1, 6, 8, and 9C, the storage controller 110 may perform the zone reallocation operation for generating the result table, based on the first table and the second table. The storage controller 110 may reallocate a block of a non-volatile memory device with a lower temperature to a zone with a higher hit ratio and may reallocate a block of a non-volatile memory device with a higher temperature to a zone with a lower hit ratio.

In some embodiments, based on results of performing the zone rating and the memory rating, the storage controller 110 may perform the zone reallocation operation such that there is satisfied the zone reallocation policy for managing an internal temperature of a storage device. When a result of performing the zone reallocation operation indicates that the internal temperature of the storage device increases above a predetermined limit, it may be determined that the zone reallocation policy is not satisfied. When the result of performing the zone reallocation operation indicates that the internal temperature of the storage device is maintained below the predetermined limit or decreases, it may be determined that the zone reallocation policy is satisfied.

For example, the storage controller 110 may reallocate blocks BLK3_1 and BLK3_2 of the third non-volatile memory device NVM3 classified as the cold type to the third zone Z3 classified as the hot zone.

For example, the storage controller 110 may reallocate blocks BLK4_1 and BLK4_2 of the fourth non-volatile memory device NVM4 classified as the cold type to the first zone Z1 classified as the warm zone.

For example, the storage controller 110 may reallocate blocks BLK1_1 and BLK1_2 of the first non-volatile memory device NVM1 classified as the warm type to the fourth zone Z4 classified as the cold zone and may reallocate blocks BLK2_1 and BLK2_2 of the second non-volatile memory device NVM2 classified as the warm type to the second zone Z2 classified as the cold zone.

Figure 10:
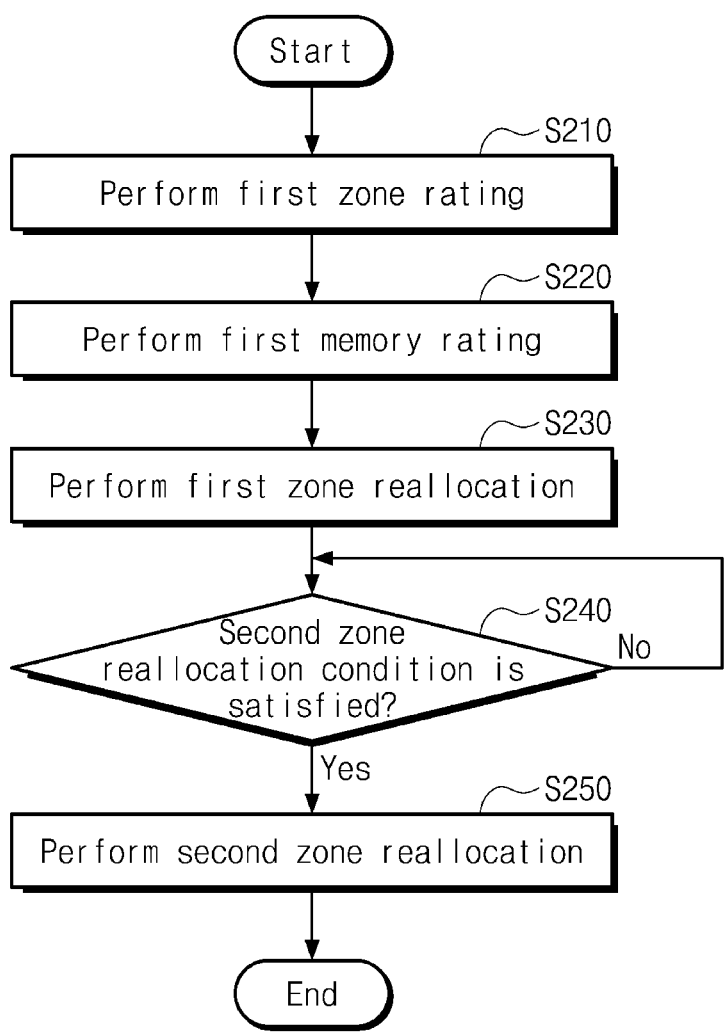
FIG. 10 is a flowchart illustrating an operating method of a storage controller according to an embodiment of the present disclosure.

FIG. 10 is a flowchart illustrating an operating method of a storage controller according to an embodiment of the present disclosure. Referring to FIGS. 1 and 10, in operation S210, the storage controller 110 may perform a first zone rating for generating a first table based on hit ratio information of the plurality of zones such that identifiers of a plurality of zones are sorted. For example, the storage controller 110 may perform the first zone rating based on the hit ratio information for the plurality of zones such that the identifiers of the plurality of zones are sorted. The storage controller 110 may generate and store the first table from a result of performing the first zone rating.

In some embodiments, the ZNS manager 111 may perform the first zone rating based on the reallocation request of the host 11.

In some embodiments, the ZNS manager 111 may perform the first zone rating after a reference time passes from a point in time when a plurality of blocks were previously allocated to the plurality of zones.

In operation S220, the storage controller 110 may perform a first memory rating for generating a second table in which identifiers of a plurality of non-volatile memory devices are sorted, based on temperature information received from the plurality of temperature sensors 130. For example, the storage controller 110 may perform the first memory rating based on the temperature information received from the plurality of temperature sensors 130 such that the identifiers of the plurality of non-volatile memory devices are sorted. The storage controller 110 may generate and store the second table from a result of performing the second memory rating.

In an embodiment, the ZNS manager 111 may perform the first memory rating while performing the first zone rating.

In operation S230, the storage controller 110 may perform a first zone reallocation operation for generating a result table based on the first table and the second table.

For example, with regard to the plurality of zones to which the plurality of blocks are allocated, based on the first table and the second table, the storage controller 110 may reallocate a block of a non-volatile memory device with a lower temperature to a zone with a higher hit ratio and may reallocate a block of a non-volatile memory device with a higher temperature to a zone with a lower hit ratio.

For example, based on results of performing the first zone rating and the first memory rating, the storage controller 110 may perform the first zone reallocation operation such that there is satisfied the zone reallocation policy for managing an internal temperature of the storage device 100. When a result of performing the first zone reallocation operation indicates that the internal temperature of the storage device 100 increases, it may be determined that the zone reallocation policy is not satisfied. When the result of performing the first zone reallocation operation indicates that the internal temperature of the storage device 100 is maintained or decreases, it may be determined that the zone reallocation policy is satisfied.

The storage controller 110 may generate and store the result table from the result of performing the first zone reallocation operation.

In operation S240, the storage controller 110 may determine whether a second zone reallocation condition is satisfied.

For example, the storage controller 110 may perform a second zone rating for generating a third table based on temperature information after a reference time passes from a point in time when the first zone reallocation operation is performed. The storage controller 110 may perform a second memory rating for generating a fourth table based on the temperature information after the reference time passes from a point in time when the first zone reallocation operation is performed. The storage controller 110 may update the result table from the third table and the fourth table. The storage controller 110 may determine whether the number of zones not satisfying the zone reallocation policy is greater than or equal to a reference value, based on the updated result table. In this case, the reference value may be set arbitrarily.

In response to determining that the second zone reallocation condition is not satisfied, the storage controller 110 may periodically determine whether the second zone reallocation condition is satisfied, based on the reference time from a point in time when it is determined that the second zone reallocation condition is not satisfied.

In operation S250, the storage controller 110 may perform a second zone reallocation operation in response to determining that the second zone reallocation condition is satisfied.

For example, with regard to the plurality of zones to which the plurality of blocks are allocated, based on the third table and the fourth table, the storage controller 110 may reallocate a block of a non-volatile memory device with a lower temperature to a zone with a higher hit ratio and may reallocate a block of a non-volatile memory device with a higher temperature to a zone with a lower hit ratio.

For example, based on results of performing the second zone rating and the second memory rating, the storage controller 110 may perform the second zone reallocation operation such that there is satisfied the zone reallocation policy for managing an internal temperature of the storage device 100.

Figure 11A:
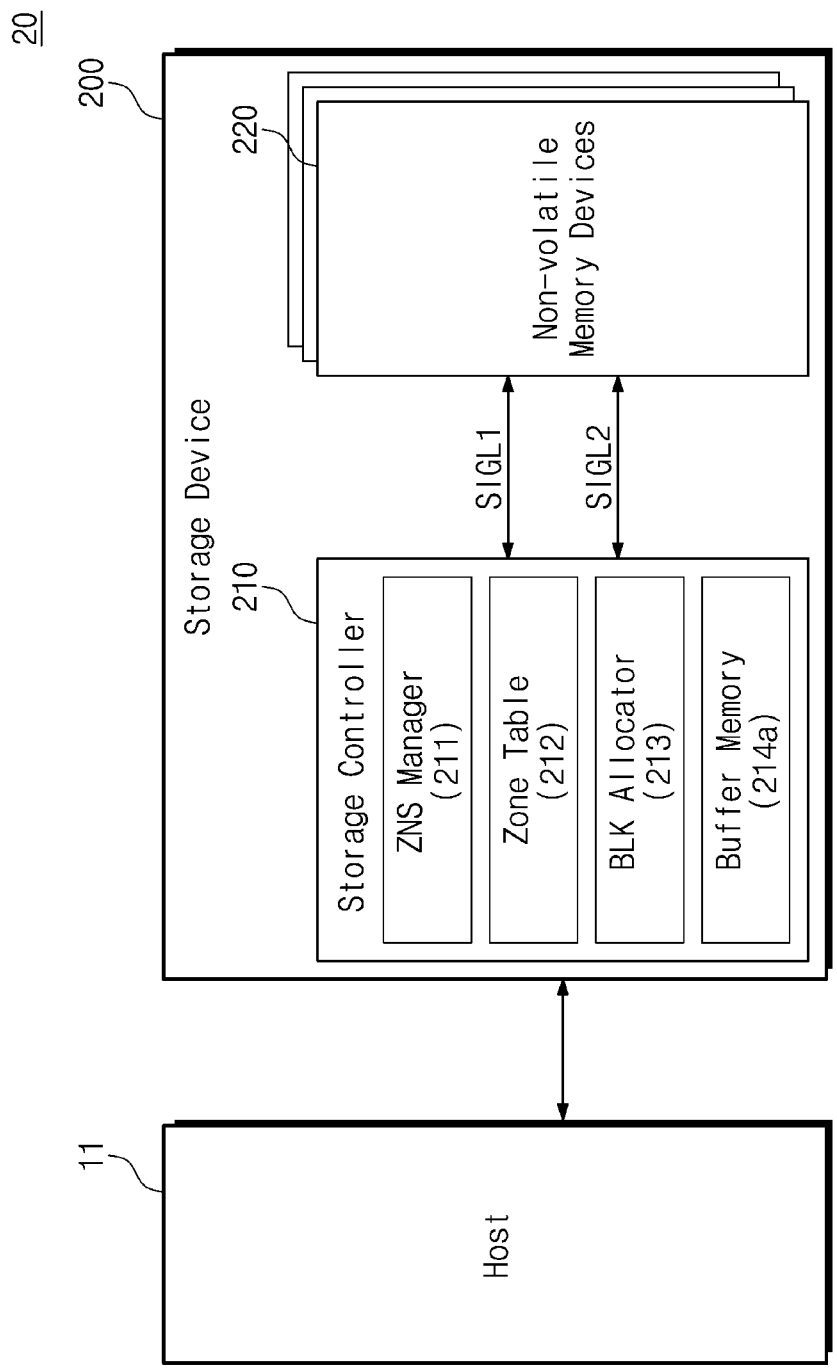
FIGS. 11A and 11B are block diagrams illustrating a storage system and a non-volatile memory device according to an embodiment of the present disclosure.
Figure 11B:
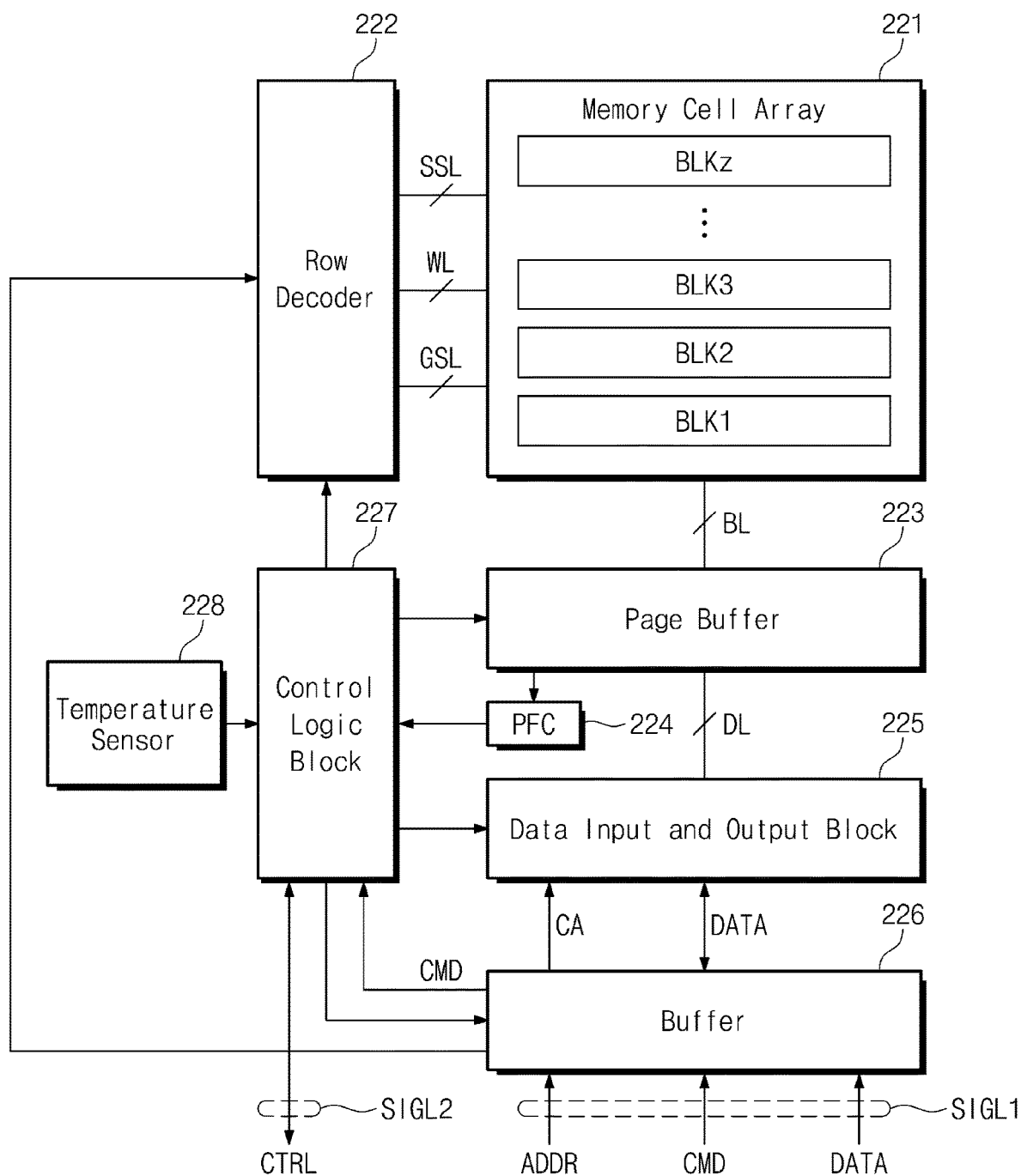

FIGS. 11A and 11B are block diagrams illustrating a storage system 20 and a non-volatile memory device 220 according to an embodiment of the present disclosure. Referring to FIGS. 1 and 11A, the storage system 20 may include the host 11 and a storage device 200.

The storage device 200 may include a storage controller 210 and a plurality of non-volatile memory devices 220. The storage controller 210 may correspond to the storage controller 110 of FIG. 1, and the plurality of non-volatile memory devices 220 may correspond to the plurality of non-volatile memory devices 120 of FIG. 1. Thus, additional description will be omitted to avoid redundancy.

Referring to FIGS. 11A and 11B, the non-volatile memory device 220 may communicate with the storage controller 210. The non-volatile memory device 220 may include a memory cell array 221, a row decoder 222, a page buffer 223, a pass/fail check block (circuit) (PFC) 224, a data input and output block (circuit) 225, a buffer 226, a control logic block (circuit) 227, and a temperature sensor 228. The memory cell array 221, the row decoder 222, the page buffer 223, the pass/fail check block (PFC) 224, the data input and output block 225, the buffer 226, and the control logic block 227 may respectively correspond to the memory cell array 121, the row decoder 122, the page buffer 123, the pass/fail check block (PFC) 124, the data input and output block 125, the buffer 126, and the control logic block 127 of FIG. 1. Thus, additional description will be omitted to avoid redundancy.

The control logic block 227 may receive temperature information about the non-volatile memory device 220 from the temperature sensor 228. For example, the control logic block 227 may obtain the temperature information about a non-volatile memory device 220 from the temperature sensor 228 in response to a command CMD received from the buffer 226.

The temperature sensor 228 may be configured to sense the temperature of the non-volatile memory device 220. The temperature sensor 228 may transmit the temperature information to the control logic block 227 based on the sensed temperature.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

According to the present disclosure, an internal temperature of a non-volatile memory may decrease by allocating a zone, without a hardware change.

According to the present disclosure, it may be possible to prevent degradation of the non-volatile memory due to a temperature without reduction of performance and to improve endurance of the non-volatile memory.

According to the present disclosure, it may be possible to prevent performance throttling due to a temperature and to improve performance of a storage device.

While the present disclosure has been described with reference to embodiments thereof, it will be apparent to those of ordinary skill in the art that various changes and modifications may be made thereto without departing from the spirit and scope of the present invention.

What is claimed is:
1. A storage device comprising:
a plurality of non-volatile memory devices, each including a plurality of memory blocks;
a plurality of temperature sensors, wherein each temperature sensor of the plurality of temperature sensors is configured to sense a temperature related to at least one of the plurality of non-volatile memory devices; and
a storage controller configured to receive a temperature information about the plurality of non-volatile memory devices from the plurality of temperature sensors,
wherein, each of the plurality of memory blocks is allocated to one of a plurality of zones, and the storage controller is configured to perform a first zone reallocation operation to reallocate a block of a non-volatile memory device with a lower temperature to a zone with a higher hit ratio and to reallocate a block of a non-volatile memory device with a higher temperature to a zone with a lower hit ratio, and
wherein the storage controller is configured to:
perform a first zone rating to generate a first table in which identifiers of the plurality of zones are sorted, based on hit ratio information of the plurality of zones;

perform a first memory rating to generate a second table in which identifiers of the plurality of non-volatile memory devices are sorted, based on the temperature information; and perform the first zone reallocation operation based on the first table and the second table to generate a result table to reallocate the plurality of memory blocks.

2. The storage device of claim 1, wherein, based on results of performing the first zone rating and the first memory rating, the storage controller performs the first zone reallocation operation to satisfy a zone reallocation policy for managing an internal temperature of the storage device.

3. The storage device of claim 2, wherein the storage controller is configured to:

classify each of the plurality of zones as one of a hot zone, a warm zone, and a cold zone, based on the result of performing the first zone rating; and classify each of the plurality of non-volatile memory devices as one of a hot type, a warm type, and a cold type, based on the result of performing the first memory rating, and wherein the first table includes a zone class of each of the plurality of zones and the second table includes a type class of each of the plurality of non-volatile memory devices.

4. The storage device of claim 3, wherein the zone reallocation policy is not satisfied when blocks of a non-volatile memory device classified as the hot type would be reallocated to a zone classified as the hot zone, when blocks of a non-volatile memory device classified as the warm type would be reallocated to a zone classified as the hot zone, when blocks of a non-volatile memory device classified as the hot type would be reallocated to a zone classified as the warm zone, or when blocks of a non-volatile memory device classified as the cold type would be reallocated to a zone classified as the cold zone.

5. The storage device of claim 4, wherein the storage controller is configured to:

determine that a zone reallocation condition is satisfied, after a reference time passes from a point in time when the first zone reallocation operation was performed; and perform a second zone reallocation operation in response to determining that the zone reallocation condition is satisfied.

6. The storage device of claim 4, wherein, the storage controller is configured to:

determine that a zone reallocation condition is not satisfied, after a reference time passes from a point in time when the first zone reallocation operation was performed; and periodically determines whether the zone reallocation condition is satisfied, based on the reference time from a point in time when it was determined that the zone reallocation condition was not satisfied.

7. The storage device of claim 5, wherein, when it is determined that the zone reallocation condition is satisfied, the storage controller is configured to:

perform a second zone rating for generating a third table based on hit ratio information of the plurality of zones after the reference time passes from a point in time when the first zone reallocation operation was performed;

perform a second memory rating for generating a fourth table based on the temperature information after the reference time passes from a point in time when the first zone reallocation operation was performed;

update the result table based on the third table and the fourth table; and determine whether the number of zones not satisfying the zone reallocation policy is greater than or equal to a reference value based on the updated result table.

8. The storage device of claim 7, wherein, when performing the second zone reallocation operation in response to determining that the second zone reallocation condition is satisfied, the storage controller is configured to:

perform the second zone reallocation operation based on the third table and the fourth table.

9. The storage device of claim 4, wherein the plurality of non-volatile memory devices include a first non-volatile memory device, a second non-volatile memory device, a third non-volatile memory device, and a fourth non-volatile memory device, wherein the plurality of temperature sensors include a first temperature sensor and a second temperature sensor, wherein the first temperature sensor senses an ambient temperature of a first group including the first and second non-volatile memory devices, wherein the second temperature sensor senses an ambient temperature of a second group including the third and fourth non-volatile memory devices, and wherein the storage controller performs the first memory rating based on the ambient temperature of the first group and the ambient temperature of the second group.

10. The storage device of claim 4, wherein each of the plurality of temperature sensors are disposed in a respective non-volatile memory device of the plurality of non-volatile memory devices.

11. The storage device of claim 4, wherein the storage controller is configured to:

receive a zone reallocation request from an external host device; and perform the first zone reallocation operation based on the zone reallocation request.

12. The storage device of claim 4, wherein the storage controller performs the first zone reallocation operation after a reference time passes from a point in time when the plurality of memory blocks were allocated to the plurality of zones.

13. The storage device of claim 4, wherein the storage controller supports a zoned namespace (ZNS) standard of NVM express.

14. An operating method of a storage device which includes a plurality of non-volatile memory devices each including a plurality of blocks, a plurality of temperature sensors, and a storage controller, the method comprising:

performing a first zone rating to generate a first table in which identifiers of a plurality of zones are sorted, based on hit ratio information of the plurality of zones;

performing a first memory rating to generate a second table in which identifiers of the plurality of non-volatile memory devices are sorted, based on temperature information received from the plurality of temperature sensors; and performing a first zone reallocation operation to generate a result table, based on the first and second tables, wherein the plurality of temperature sensors obtain the temperature information by sensing temperatures related to the plurality of non-volatile memory devices, and wherein, performing the first zone reallocation operation includes reallocating a block of a non-volatile memory device with a lower temperature to a zone with a higher hit ratio and reallocating a block of a non-volatile memory device with a higher temperature to a zone with a lower hit ratio, with regard to the plurality of zones to the plurality of blocks are allocated.

15. The method of claim 14, wherein the first zone reallocation operation is performed to satisfy a zone reallocation policy for managing an internal temperature of the storage device based on results of performing the first zone rating and the first memory rating.

16. The method of claim 15, wherein the performing of the first zone rating for generating the first table in which the identifiers of the plurality of zones are sorted, based on the hit ratio information of the plurality of zones includes:
classifying each of the plurality of zones as one of a hot zone, a warm zone, and a cold zone based on the hit ratio information, and
wherein the performing of the first memory rating to generate the second table in which the identifiers of the plurality of non-volatile memory devices are sorted, based on the temperature information includes: classifying each of the plurality of non-volatile memory devices as one of a hot type, a warm type, and a cold type based on the temperature information.

17. The method of claim 16, wherein the zone reallocation policy is not satisfied when blocks of a non-volatile memory device classified as the hot type are reallocated to a zone classified as the hot zone, when blocks of a non-volatile memory device classified as the warm type are reallocated to a zone classified as the hot zone, when blocks of a non-volatile memory device classified as the hot type are reallocated to a zone classified as the warm zone, or when blocks of a non-volatile memory device classified as the cold type are reallocated to a zone classified as the cold zone.

18. The method of claim 17, further comprising:
determining that a zone reallocation condition is satisfied, after a reference time passes from a point in time when the first zone reallocation operation was performed; and
performing a second zone reallocation operation in response to determining that the zone reallocation condition is satisfied.

19. A storage controller comprising:
a ZNS manager configured to communicate with a plurality of non-volatile memory devices each including a plurality of blocks and to receive temperature information about the plurality of non-volatile memory devices from a plurality of temperature sensors configured to respectively sense temperatures of the plurality of non-volatile memory devices; and
a block allocator configured to allocate the plurality of blocks to a plurality of zones under control of the ZNS manager,
wherein, each of the plurality of memory blocks is allocated to one of a plurality of zones and the block allocator is configured to perform a zone reallocation operation to reallocate a block of a non-volatile memory device with a lower temperature to a zone with a higher hit ratio and to reallocate a block of a non-volatile memory device with a higher temperature to a zone with a lower hit ratio,
wherein the ZNS manager is configured to:
perform a zone rating to sort identifiers of the plurality of zones, based on hit ratio information of the plurality of zones;
perform a memory rating to sort identifiers of the plurality of non-volatile memory devices, based on the temperature information, and
wherein the block allocator performs a zone reallocation operation based on results of performing the zone rating and the memory rating.

20. The storage controller of claim 19, further comprising:
a zone table controller configured to generate at least one table for managing block allocation information indicating blocks allocated to each of the plurality of zones under control of the ZNS manager,
wherein the zone table controller generates a first table from the result of performing the zone rating and generates a second table from the result of performing the memory rating, and
wherein the block allocator performs the zone reallocation operation based on the first table and the second table.

* * * * *